United States Patent
Kretschmar et al.

[15] 3,673,261
[45] June 27, 1972

[54] PERFUME COMPOUNDS AND PROCESS FOR PREPARING SAME

[72] Inventors: Herbert C. Kretschmar, Greenhills; William F. Erman, Springfield Township, Hamilton County, both of Ohio

[73] Assignee: The Procter & Gamble Company, Cincinnati, Ohio

[22] Filed: Dec. 12, 1969

[21] Appl. No.: 884,686

[52] U.S. Cl. ............................260/617 F, 252/108, 252/522, 252/558, 260/345.2, 260/468, 260/598
[51] Int. Cl. .....................................C07c 27/00, C07c 35/22
[58] Field of Search ...................................260/617 F, 631.5

[56] References Cited

UNITED STATES PATENTS 3,478,114  11/1969  Lewis et al..........................260/631.5
3,492,330  1/1970  Trecker et al................260/617 F UX

OTHER PUBLICATIONS

Colonoge et al., Bull. Suc. Chim. France, 1966 (1), 374–376

*Primary Examiner*—Howard T. Mars
*Attorney*—Jack D. Schaeffer and Julius P. Filcik

[57] ABSTRACT

The compounds 2-methylene-3-exo(trans-4'-methyl-5'-hydroxypent-3'-enyl)bicyclo[2.2.1]heptane, 2-methylene-3-exo-(cis-4'-methyl-5'-hydroxypent-3'-enyl)bicyclo[2.2.1]heptane and 2-methylene-3-exo(4'-methyl-5'-hydroxypentyl)bicyclo[2.2.1]-heptane, all of which are useful as perfumes, and processes for their preparation are disclosed.

6 Claims, No Drawings

PERFUME COMPOUNDS AND PROCESS FOR PREPARING SAME

FIELD OF THE INVENTION

This invention relates to perfume compounds. More specifically this invention relates to certain synthetic bicyclo[2.2.1] heptanes having valuable odor characteristics of sandalwood and useful in perfume compositions and to processes for preparing these compounds.

HISTORY OF THE INVENTION

East Indian sandalwood oil has heretofore been available only from East Indian sandalwood trees. This oil and various individual components of the oil are highly valued perfume bases and are used in large quantities by the perfume industry. The oil, however, is expensive and is in limited and sometimes sporadic, supply. For this reason, a continuous effort has been made to synthesize the various components of sandalwood oil or similar synthetic materials which possess odors similar to the desirable woody fragrance of sandalwood oil.

These synthetic bicyclo[2.2.1]heptanes and the processes for preparing these compounds represent a portion of an extensive scientific effort to prepare compounds having the valuable characteristics of sandalwood. Other processes and compounds relating to the synthesis of synthetic sandalwood oil components are described in the following co-pending U.S. applications: Fanta and Erman, 3-endo-Methyl-3-exo(4'-methyl-5'-hydroxypentyl)norcamphor and 2-Methyl-5-bromopentanol, and Process for the Preparation of These Compounds, Ser. No. 717,360, filed Mar. 29, 1968 now U.S. Pat. No. 3,579,479; Fanta and Erman, Tetrahydropyranyl Ether Compounds and Process for Preparation of These Compounds and 3-endo-Methyl-3-exo(4'-methyl-5'-hydroxypentyl)norcamphor, Ser. No. 717,384, filed Mar. 29, 1968 and now abandoned; Fanta and Erman, Preparation of 3-endo-Methyl-3-exo(4'-methyl-5'-hydroxypentyl)norcamphor from 2-Methyl-4-pentenol, Ser. No. 717,362, filed Mar. 29, 1968 now U.S. Pat. No. 3,580,953; Fanta and Erman, Preparation of 3-endo-Methyl-3-exo(4'-methyl-5'-hydroxypentyl)norcamphor from 2-Methyl-4-pentenol, Ser. No. 717,458, filed Mar. 29, 1968; Kretschmar, Fanta and Erman, Process for Preparing 3-endo-Methylnorcamphor from 2-Methylnorborn-2-ene, Ser. No. 731,653, filed May 23, 1968; Gibson, Kretschmar and Erman, Process for Preparing 3-Methylnorcamphor from 2-Methylnorborn-2-ene, Ser. No. 731,652, filed May 23, 1968; Fanta and Erman, Process for Preparing Dihydro-β-santalol from 3-endo-Methyl-3-exo(4'-methyl-5'-hydroxypentyl)norcamphor, Ser. No. 779,233, filed Nov. 26, 1968; Kretschmar and Erman, Process for Preparing β-Santalol from 3-Methylnorcamphor, Ser. No. 826,682, filed May 21, 1969; and Kretschmar and Erman, Process for Preparing β-Santalol from 3-Methylnorcamphor, Ser. No. 826,684, filed May 21, 1969; and Pieper and Gibson, 3-endo-Methyl-3-exo(4'-methylpentananyl-2-methylenebicyclo[2.2.1]heptane and Process for Preparing Same Ser. No. 855,043, filed Sept. 3, 1969.

SUMMARY OF THE INVENTION

This invention relates to synthetic perfume compounds which are valuable synthetic perfume components and have a desirable sandalwood odor. These compounds are novel bicyclo[2.2.1] heptane compounds two of which have olefinic unsaturation in the side chain giving rise to *cis* and *trans* isomers, e.g., 2-methylene-3-exo(trans-4'-methyl-5'-hydroxypent-3'-enyl)bicyclo[2.2.1]heptane and 2-methylene-3-exo(cis-4'-methyl-5'-hydroxypent-3'-enyl)bicyclo[2.2.1]heptane, and a third compound which contains no unsaturation in the side chain, e.g., 2-methylene-3-exo(4'-methyl-5'-hydroxypentyl)bicyclo[2.2.1]heptane.

The first of these compounds, 2-methylene-3-exo(trans-4'-methyl-5'-hydroxypent-3'-enyl)bicyclo[2.2.1]heptane has the structural formula shown below:

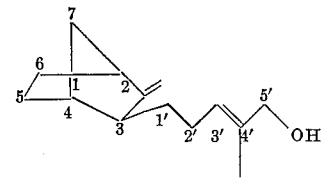

2-methylene-3-exo(trans-4'-methyl-5'-hydroxypent-3'-enyl)bicyclo[2.2.1]-heptane trans-3-Normethyl-β-santalol Hereinafter this compound will be referred to in the disclosure and the appended claims either using its bicyclic nomenclature or the term, trans-3-normethyl-β-santalol.

The second of these bicyclic compounds, 2-methylene-3-exo-(cis-4'-methyl-5'-hydroxypent-3'-enyl)bicyclo[2.2.1]heptane has the following structural formula

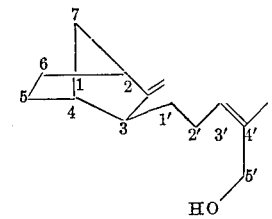

2-methylene-3-exo(cis-4'-methyl-5'-hydroxypent-3'-enyl)bicyclo[2.2.1]-heptane cis-3-normethyl-β-santalol Hereinafter the above compound will be referred to using either its bicyclic nomenclature or cis-3-normethyl-β-santalol.

The third of the novel compounds disclosed herein, 2-methylene-3-exo(4'-methyl-5'-hydroxypentyl)bicyclo[2.2.1]-heptane, has the structural formula shown below:

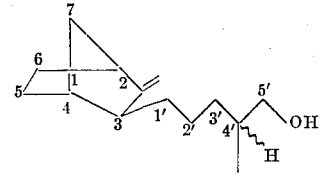

2-methylene-3-exo(4'-methyl-5'-hydroxypentyl)bicyclo[2.2.1]heptane 3-normethyldihydro-β-santalol Hereinafter the above compound will be referred to using either the bicyclic nomenclature given above or the term, 3-normethyldihydro-β-santalol.

All of the above normethyl-β-santalol derivatives are valuable as perfume components useful in the preparation of perfumes having an odor described as sandalwood. More specifically these derivatives possess a sweet woody fragrance having the characteristics of sandalwood oil. Thus these compounds have utility as perfume components or as perfumes per se.

The processes described herein comprise Routes I, II and III. In each of these processes Step 1 is the same and involves the reaction of 2-methylbicyclo[2.2.1]hept-2-ene with acrolein. Routes I, II and III all describe synthetic routes using the reaction products obtained from the reaction of 2-methyl-bicyclo[2.2.1]hept-2-ene and acrolein. For example, Route I describes a process for preparing cis -and trans-3-normethyl-β-santalol. Route II also describes a process for preparing 3-normethyl-β-santalol. Route III describes a process for preparing a similar compound 3-normethyldihydro-β-santalol.

Route I involves the preparation of 2-methylene-3-exo (cis-4'-methyl-5'-hydroxypent-3'-enyl)bicyclo[2.2.1]-heptane and 2-methylene-3-exo(trans-4'-methyl-5'-hydroxypent-3'-enyl)bicyclo [2.2.1]heptane and comprises the steps of (1) heating 2-methyl-bicyclo[2.2.1]hept-2-ene with acrolein to obtain 2-methyl-3-oxatricyclo[6.2.1.0$^{2,7}$]undec-4-ene and 2-methylene-3-exo-(3'-oxopropyl)bicyclo[2.2.1]heptane; (2) hydrating the 2-methyl-3-oxatricyclo[6.2.1.0$^{2,7}$]undec-4-ene obtained in Step 1 with an aqueous mineral acid to obtain 2-methyl-3-oxo-4-hydroxytricyclo [6.2.1.0$^{2,7}$]undecane; (3) reacting the 2-methyl-3-oxa-4-hydroxytricyclo[6.2.1.0$^{2,7}$]undecane with (carbethoxyethylidine)-triphenyl phosphorane to obtain 2-endo-methyl-2-exo-hydroxy-3-exo(cis-4'-carbethoxypent-3'-enyl)bicyclo[2.2.1]heptane and 2-endo-methyl-2-exo-hydroxy-3-exo(trans-4'-carbethoxypent-3'-enyl)bicyclo[2.2.1heptane; (4) dehydrating 2-endo-methyl-2-exo-hydroxy-3-exo(cis-4'-carbethoxypent-3'-enyl)bicyclo[2.2.1]heptane and 2-endo-methyl-2-exo-hydroxy-3-exo(trans-4'-carbethoxypent-3'-enyl)bicyclo[2.2.1]heptane obtained in Step 3 with a dehydrating agent to obtain 2-methylene-3-exo-(cis-4'-carbethoxypent-3'enyl) bicyclo[2.2.1]heptane and 2-methylene-3-exo(trans-4'-carbethoxypent-3'-enyl-bicyclo[2.2.1]heptane; and (5) reducing 2-methylene-3-exo(cis-4'-carbethoxypent-3'-enyl)bicyclo[2.2.1]heptane and 2-methylene-3-exo(trans-4'-carbethoxypent-3'-enyl)bicyclo(2.2.1]heptane obtained in Step 4 with a reducing agent to obtain 2-methylene-3-exo(cis-4'-methyl-5'-hydroxypent-3'-enyl)bicyclo[2.2.1]heptane and 2-methylene-3-exo-(trans-4'-methyl-5'-hydroxy-pent-3'-enyl)bicyclo[2.2.1]heptane.

Route II describes a process for preparing 2-methylene-3-exo(cis-4'-methyl-5'-hydroxypent-3'-enyl)bicyclo[2.2.1]-heptane and 2-methylene-3-exo(trans-4'-methyl-5'-hydroxypent-3'-enyl) bicyclo[2.2.1]heptane and comprises the steps of (1)heating 2-methylbicyclo[2.2.1]hept-2-ene with acrolein to obtain 2-methyl-3-oxatricyclo[6.2.1.0$^{2,7}$]undec-4-ene and 2-methylene-3-exo-(3'-oxopropyl)bicyclo[2.2.1]heptane; (2) reacting the 2-methylene-3-exo-(3'-oxopropyl)bicyclo[2.2.1]heptane reaction product of Step 1 with (carbethoxyethylidene)-triphenyl phosphorane to obtain 2-methylene-3-exo(cis-4'-carbethoxypent-3'-enyl)bicyclo[2.2.1.heptane and 2-methylene-3-exo(trans-4'-carbethoxypent-3'-enyl) bicyclo[2.2.1]heptane; and (3) reducing 2-methylene-3-exo(cis-4'-carbethoxypent-3'-enyl)bicyclo[2.2.1.heptane and 2-methylene-3-exo-(trans4' -carbethoxypent-3'-enyl)bicyclo[2.2.1]heptaneobtained in Step 2 with a reducing agent to obtain 2-methylene-3-exo (cis-4'-methyl-5'-hydroxypent-3'-enyl)bicyclo[2.2.1]heptane and 2-methylene-3-exo(trans-4'-methyl-5'-hydroxypent-3'-enyl)bicyclo[2.2.1]heptane.

Route III describes the process for preparing 2-methylene-3-exo(4'-methyl-5'-hydroxypentyl)bicyclo[2.2.1]heptane and comprises the steps of (1) heating 2-methylbicyclo[2.2.1]hept-2-ene with acrolein to obtain 2-methyl-3-oxatricyclo[6.2.1.0$^{2,7}$]undec-4-ene and 2-methylene-3-exo-(3'-oxopropyl)bicyclo[2.2.1]heptane; (2) hydrating the 2-methyl-3-oxatricyclo[6.2.1.0$^{2,7}$]undec-4-ene obtained in Step 1 with aqueous mineral acid to obtain 2-methyl-2-oxa-4-hydroxytricyclo[6.2.1.0$^{2,7}$]undecane; (3) reacting 2-methyl-3-oxa-4-hydroxytricyclo[6.2.1.0$^{2,7}$]undecane obtained in Step 2 with (carbethoxyethylidine)-triphenyl phosphorane to obtain 2-endo-methyl-2-exo-hydroxy-3-exo(cis-4'-carbethoxypent-3'-enyl)bicyclo[2.2.1]heptane and 2-endo-methyl-2-exo-hydroxy-3-exo(trans-4'-carbethoxypent-3'-enyl)bicyclo(2.2.1)heptane; (4) hydrogenating 2-endo-methyl-2-exo-hydroxy-3-exo(cis-4'-carbethoxypent-3'-enyl)bicyclo[2.2.1]heptane and 2-endo-methyl-2-exo-hydroxy-3-exo(trans- 4'-carbethoxypent-3'-enyl)bicyclo[2.2.1]heptane obtained in Step 3 to obtain 2-endo-methyl-2-exo(4'-carbethoxypentyl)bicyclo[2.2.1]-heptane; (5) dehydrating 2-endo-methyl-2-exo-hydroxy-3-exo(4'-carbethoxypentyl) bicyclo[2.2.1]heptane obtained in Step 4 to obtain 2-methylene-3-exo(4-carbethoxypentyl)bicyclo[2.2.1]heptane; and (6) reducing 2-methylene-3-exo-(4'-carbethoxypentyl)bicyclo[]heptane obtained in Step 5 with a reducing agent to obtain 2-methylene-3-exo(4'-methyl-5'-hydroxpentyl)bicyclo[2.2.1]heptane.

2-Methylene-3-exo(cis-4'-methyl-5'-hydroxypent-3'-enyl)-bicyclo[2.2.1]heptane, 2-methylene-3-exo(trans-4'-methyl-5'-hydroxypent-3'-enyl)bicyclo[2.2.1]heptane, and 2-methylene-3-exo(4'-methyl-5'-hydroxypentyl)bicyclo[2.2.1]heptane are novel compounds and are useful as perfume components.

DETAILED DESCRIPTION OF THE PROCESSES

ROUTE I

Route I can be used to prepare cis- and trans-3-normethyl-β-santalol.

The starting material used in Route I for preparing 2-methylene-3-exo(cis-4'-methyl-5'-hydroxypent-3'-enyl)bicyclo[2.2.1]heptane (cis-3-normethyl-β-santalol) and 2-methylene-3-exo(trans-4'-methyl-5'-hydroxypent-3'-enyl)bicyclo[2.2.1]-heptane (trans-3-normethyl-β-santalol) is 2-methylbicyclo[d82.2.1]hept-2-ene. 2-Methylbicyclo[2.2.1]hept-2-ene can be prepared according to the method of K. Alder and H. J. Ache, *Chem. Ber.*, 95, 503 (1962). In the method of Alder et al., methylcyclopentadiene dimer is condensed with a large excess of ethylene and 2-methylbicyclo[2.2.1]hept-2-ene is obtained.

STEP 1

Step 1 of Route I encompasses reacting 2-methylbicyclo[2.2.1]hept-2-ene with acrolein according to the following equation:

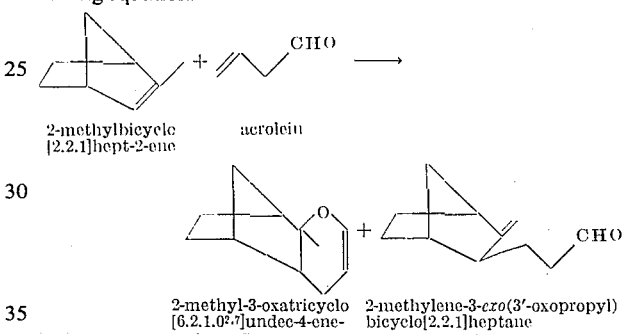

2-methyl-3-oxatricyclo   2-methylene-3-*exo*(3'-oxopropyl)
[6.2.1.0$^{2,7}$]undec-4-ene-   bicyclo[2.2.1]heptane in which 2-methyl-3-oxatricyclo[6.2.1.0$^{2,7}$]undec-4-ene and 2-methylene-3-exo(3'-oxopropyl)bicyclo[2.2.1]heptane is obtained.

Generally in the process of this invention the 2-methylbicyclo[2.2.1]hept-2-ene is mixed with the acrolein in a molar ratio of 1:1 to 10:1, preferably 1.5 : 1 to 3 : 1, and heated to 100° to 225° C. for a period of 1 hour to 24 hours. In general the two materials are simply mixed in a molar ratio of 2-methylbicyclo[2.2.1]hept-2-ene to acrolein within the stated range and heated to the temperature above described and for the time above described. The acrolein condenses with the 2-methylbicyclo[2.2.1]hept-2-ene to form as the major reaction product 2-methyl-3-oxatricyclo[6.2.1.0$^{2,7}$]undec-4-ene. Where desired an organic solvent can be used. Suitable such solvents are aliphatic hydrocarbon solvents such as hexane, heptane, octane and decane; alcohol solvents such as methanol, ethanol, propanol, butanol and pentanol; polyfunctional solvents such as ethylene glycol, propylene glycol, and glycerol; ether solvents such as diethyl ether, methyl ethyl ether, dimethyl ether, dibutyl ether, tetrahydrofuran, 1,2-dimethoxyethane, and dioxane; and aromatic hydrocarbon solvents such as benzene, xylene, and toluene. However, it is not necessary to use a solvent.

STEP 2

Step 2 of Route I involves the hydration of the 2-methyl-3-oxatricyclo[6.2.1.0$^{2,7}$]undec-4-ene reaction product of Step 1 with an aqueous mineral acid such as hydrochloric or sulfuric acid whereby 2-methyl-3-oxatricyclo[6.2.1.0$^{2,7}$]undec-4-ene is transformed according to the following equation:

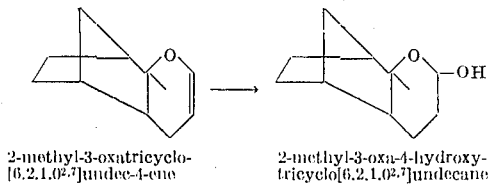

2-methyl-3-oxatricyclo-   2-methyl-3-oxa-4-hydroxy-
[6.2.1.0$^{2,7}$]undec-4-ene   tricyclo[6.2.1.0$^{2,7}$]undecane and 2-methyl-3-oxa-4-hydroxytricyclo[6.2.1.0$^{2,7}$]undecane is obtained. In general in this step of the process the 2-methyl-3-oxatricyclo[6.2.1.0$^{2,7}$]undec-4-ene Step 1 reaction product is dissolved in an organic solvent such as diethyl ether, methyl ethyl ether, dimethyl ether, dibutyl ether, tetrahydrofuran, dimethoxyethane and dioxane, and aromatic hydrocarbon solvents such as benzene, xylene and toluene; and acetic acid. The 2-methyl-3-oxatricyclo[6.2.1.0$^{2,7}$]undec-4-ene in the solvent is then hydrated by treatment with an aqueous mineral acid, at a concentration of from 0.001 to 5.0 molar, in a molar ratio of from 1:1 to 1:50 of 2-methyl-3-oxatricyclo[6.2.1.0$^{2,7}$]undec-4-ene to acid. The mixture is stirred for from 0.5 to 24 hours at a temperature of from 27° to 100° C. In this procedure, water is added across the double bond of the 2-methyl-2-oxo-bicyclo[6.2.1.0$^{2,7}$]undec-4-ene to obtain 2-methyl-3-oxa-4-hydroxytricyclo[6.2.1.0$^{2,7}$]undecane. This reaction product, 2-methyl-3-oxa-4-hydroxytricyclo[6.2.1.0$^{2,7}$]undecane, obtained as a result of Step 2, is the starting material used in Step 3 of Route I.

STEP 3

Step 3 of Route I involves the reaction of 2-methyl-3-oxa-4-hydroxytricyclo[6.2.1.0$^{2,7}$]undecane produced in Step 2 with (carbethoxyethylidene)-triphenyl phosphorane. (Carbethoxyethylidene)-triphenyl phosphorane has the following formula

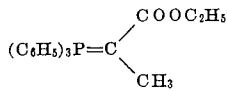

The reaction of 2-methyl-3-oxa-4-hydroxytricyclo[6.2.1.0$^{2,7}$]undecane with the above phosphorane results in the formation of a mixture of the cis and trans isomers of 2-endo-methyl-2-exo-hydroxy-3-exo-(4'-carbethoxypent-3'-enyl)bicyclo[2.2.1]heptane according to the following:

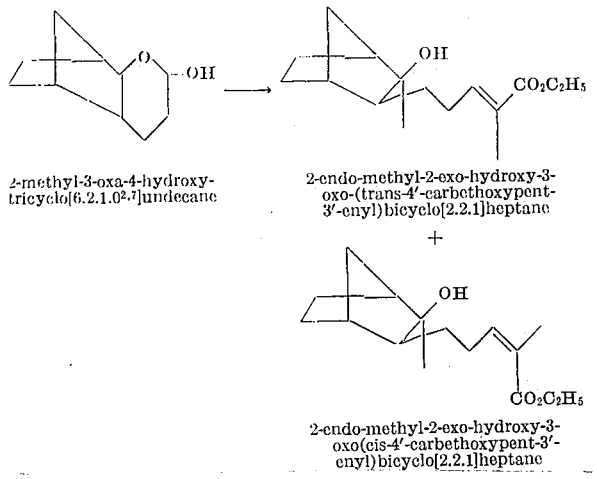

2-methyl-3-oxa-4-hydroxy-tricyclo[6.2.1.0$^{2,7}$]undecane 2-endo-methyl-2-exo-hydroxy-3-oxo-(trans-4'-carbethoxypent-3'-enyl)bicyclo[2.2.1]heptane

+

2-endo-methyl-2-exo-hydroxy-3-oxo(cis-4'-carbethoxypent-3'-enyl)bicyclo[2.2.1]heptane In Step 3 in which the phosphorane is reacted with 2-methyl-3-oxa-4-hydroxytricyclo[6.2.1.0$^{2,7}$]undecane, the reactants are normally used in a molar ratio of 2-methyl-3-oxa-4-hydroxytricyclo [6.2.1.0$^{2,7}$]undecane to phosphorane of from about 1:1 to about 1:5, preferably from about 1:1 to about 1:2. Most preferably, an excess of the phosphorane, e.g., 1:2, is used in order to insure that all of the starting material of Step 3 is converted to the ester. This process, normally referred to as the Wittig reaction, is well known and is described by G. Wittig and M. Schoellkopf, *Org. Syn.*, 40, 66 (1960), and by H. O. House, *Modern Synthetic Reactions*, pp. 245–256, W. A. Benjamin, Inc., New York (1965).

An organic solvent is preferably used in Step 3. Suitable solvents are the chlorinated hydrocarbons, such as methylene chloride, chloroform, carbon tetrachloride, and 1,2-dichloroethane; alcohols such as ethanol, methanol, propanol, iso-propanol, butanol, and pentanol; polyols such as ethylene glycol, propylene glycol, and glycerol; and ether solvents such as diethyl ether, methylethyl ether, dimethyl ether, dibutyl ether, tetrahydrofuran, 1,2-dimethoxyethane, and dioxane. Dimethyl sulfoxide at 60° is especially preferred. The starting material is generally used in a weight ratio to solvent of from about 1:2 to about 1:50, preferably from about 1:5 to about 1:10.

The temperature of the reaction can range from about 4° C. to about 100° C. The reaction is generally run at about room temperature, e.g., from about 30° C. to about 60° C. The time of the reaction depends upon the concentrations of the reactants and the reaction temperature and generally ranges from about 1 to 100 hours, preferably from about 24 to about 48 hours. Solvent mixtures of the two reactants are simply prepared, poured together, stirred, and allowed to react for the period described above. It is not necessary in this step of the reaction to use an inert atmosphere, although it can be employed if desired.

STEP 4

Step 4 of Route I involves the dehydration of the reaction product of Step 3, the mixture of the cis and trans isomers of 2-endo-methyl-2-exo-hydroxy-3-exo(4'-carbethoxypent-3'-enyl)bicyclo[2.2.1]heptane with a dehydrating agent to form a mixture of cis and trans isomers of 2-methylene-3-exo(4'-carbethoxypent-3'-enyl)bicyclo[2.2.1]heptane according to the following:

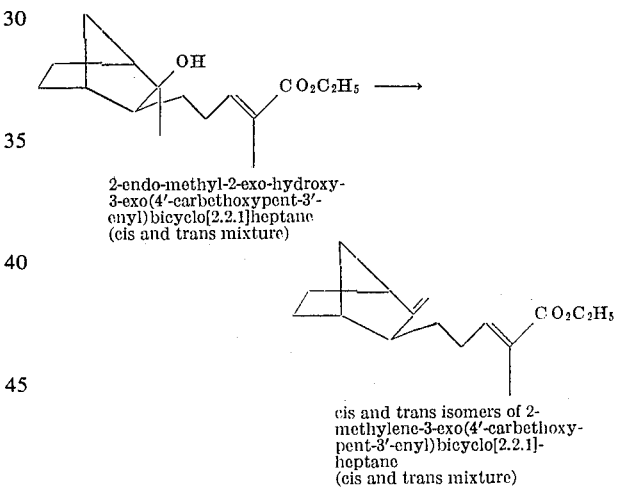

2-endo-methyl-2-exo-hydroxy-3-exo(4'-carbethoxypent-3'-enyl)bicyclo[2.2.1]heptane (cis and trans mixture)

cis and trans isomers of 2-methylene-3-exo(4'-carbethoxypent-3'-enyl)bicyclo[2.2.1]heptane (cis and trans mixture)

Suitable dehydrating agents for use in Step 4 of Route I are thionyl chloride, phosphorus oxychloride, boron trifluoride, aluminum oxide, sulfuric acid and p-toluene sulfonic acid. Any of these dehydrating agents can be used to transform the hydroxyl group into a methylene group. The dehydrating agents are normally used in the molar ratio of starting material (cis and trans mixture) to dehydrating agent of from about 100:1 to about 1:20, preferably from about 1:1 to about 1:10.

The dehydration reaction of Step 4 is preferably carried out in an anhydrous organic solvent. Suitable anhydrous solvents for use with thionyl chloride, phosphorus oxychloride, aluminum oxide, sulfuric acid and p-toluenesulfonic acid are halogenated hydrocarbons, such as carbon tetrachloride, chloroform, methylene chloride, and 1,2-dichloroethane; aromatic hydrocarbon solvents, such as benzene, toluene, and xylene; aliphatic hydrocarbon solvents, such as pentane, hexane, heptane, octane, cyclopentane, cyclohexane, and cyclooctane; and ether solvents, such as diethyl ether, methylether ether, dibutyl ether, tetrahydrofuran, 1,2-dimethoxyethane, and dioxane. The halogenated hydrocarbon solvents are preferred for use with these dehydrating agents and of these methylene chloride is most preferred The abovementioned solvents are also suitable for use with boron trifluoride. Where boron trifluoride is used as the dehydrating agent ether solvents are preferred. Where thionyl chloride is used, pyridine is the preferred solvent although other solvents can also be used. Thionyl chloride is preferred as the dehydrating agent. Thionyl chloride with pyridine is especially preferred as the dehydrating agent solvent combination. The starting material (cis and trans mixture) is generally used in a weight ratio to the solvent of from about 1:0.5 to about 1:50, preferably from about 1:5 to about 1:20.

The temperature of this step of Route I is dependent upon the type of dehydrating agent and the solvent used, but normally ranges from about −20° C. to about 50° C. With thionyl chloride, phosphorus oxychloride, aluminum oxide, sulfuric acid and p-toluene sulfonic acid, in any of the above mentioned solvents, the temperature of the reaction can range from about −20° C. to about 20° C. With these dehydrating agents it is preferred that the dehydrating step be run at about 0 C. for high yields. When boron trifluoride is used in an ether solvent as the dehydrating agent, a higher temperature of from about 25° C. to about 50° C., (generally the reflux temperature of the boron trifluoride/ether/starting material mixture) is used. Neither the dehydrating agent used nor the solvent employed is a critical consideration in this step of the process and the dehydrating agent and solvent can be selected on the basis of convenience. The time of the reaction generally ranges from about 30 minutes to about 3 hours, again depending upon the reaction conditions and concentrations used. More preferably, the reaction time ranges from about 1 to about 2 hours. The dehydrating step is usually conducted under an inert atmosphere such as argon, helium, or nitrogen, to prevent the contacting of moisture from the atmosphere.

The dehydration reaction of Step 4 provides both cis and trans-2-methylene-3-exo(4'-carbethoxypent-3'-enyl)bicyclo[2.2.1]heptane. The cis and trans isomers are shown as follows:

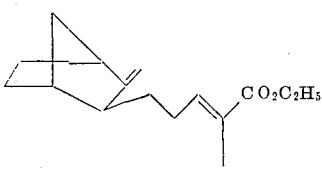

2-methylene-3-exo(trans-4'-carbethoxypent-3'-enyl)-bicyclo[2.2.1]heptane

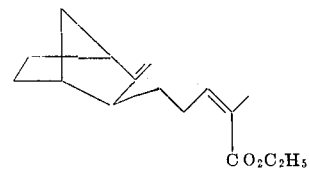

2-methylene-3-exo(cis-4'-carbethoxypent-3'-enyl)bicyclo[2.2.1]heptane

STEP 5

The last step of Route I, Step 5, involves the reduction of the mixture of cis- and trans-isomers of 2-methylene-3-exo(4'-carbethoxypent-3'-enyl)bicyclo[2.2.1]-heptane formed in Step 4, with a reducing agent such as lithium aluminum hydride and aluminum hydride in ether solvents or sodium, potassium or lithium in the presence of an alkanol solvent. A mixture of cis- and trans-alcohols, cis-3-normethyl-β-santalol and trans-3-normethyl-β-santalol, is obtained according to the following:

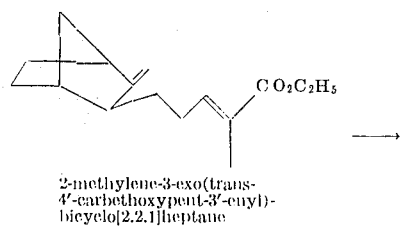

2-methylene-3-exo(trans-4'-carbethoxypent-3'-enyl)-bicyclo[2.2.1]heptane

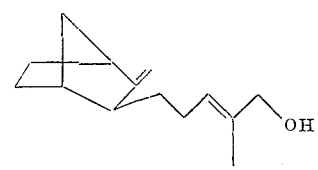

trans-3-normethyl-β-santalol
2-methylene-3-exo(trans-4'-methyl-5'-hydroxypent-3'-enyl)bicyclo[2.2.1]heptane

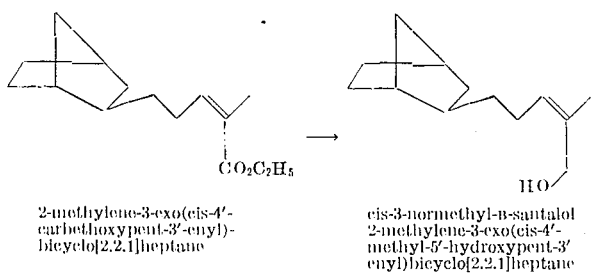

2-methylene-3-exo(cis-4'-carbethoxypent-3'-enyl)-bicyclo[2.2.1]heptane cis-3-normethyl-β-santalol
2-methylene-3-exo(cis-4'-methyl-5'-hydroxypent-3'-enyl)bicyclo[2.2.1]heptane In Step 5 of Route I the reactants are generally used in equivalent amounts. Since lithium hydride has four available hydrogens for use in the reduction reaction, the molar ratio of the cis and trans mixture to lithium aluminum hydride can range from about 1:0.20 to about 1:0.35. Where sodium, potassium, or lithium and an alkanol in suitable solvents are used as the reducing agent, the molar ratio of cis and trans mixture to reducing agent can range from about 1:1 to about 1:1.5, preferably equivalent amounts, i.e., 1:1.

An anhydrous organic solvent is preferably used in Step 5 of Route I. Where lithium aluminum hydride is used as the reducing agent suitable such solvents are ether solvents, such as diethyl ether, methylethyl ether, dibutyl ether, tetrahydrofuran, 1,2-dimethoxyethane, and dioxane; aliphatic hydrocarbon solvents, such as pentane, hexane, heptane, octane, cyclopentane, cyclohexane, and cyclooctane; and aromatic hydrocarbon solvents, such as benzene, toluene, and xylene. Ether solvents are preferred and tetrahydrofuran is especially preferred. Where sodium, potassium, or lithium is used as the reducing agent, alcohol solvents are used. Suitable alcohol solvents are the alkanols methanol, ethanol, propanol, iso-propanal, butanol, and pentanol. Methanol and ethanol are preferred. The starting material (cis and trans mixture) is generally used in the weight ratio of starting material to solvent of from about 1:5 to about 1:50, preferably from about 1:10 to about 1:20.

The temperature at which the reaction is run can range from about −50° C. to about 20° C., preferably from about −10° C. to about 5° C. The time of the reaction will be dependent upon the reactant concentrations and reaction conditions. The reaction is generally a rapid one requiring from about 5 minutes to about 2 hours, more preferably about 30 minutes to about 1 hour. An inert atmosphere such as argon, nitrogen or helium is also used to protect the reactants from moisture. The order of addition of the reactants is not important. The solution containing the ester mixture is generally added to the solution containing the reducing agent as a convenience, although this is not necessary. Where desired a solution containing the reducing agent can be added to the ester.

ROUTE II

Route II also relates to the preparation of cis- and trans-3-normethyl-β-santalol.

STEP 1

Step 1 of Route II is the same as Step 1 of Route I and the reaction products obtained, starting materials used and conditions applicable are identical. Step 1 of Route I and Route II is summarized below.

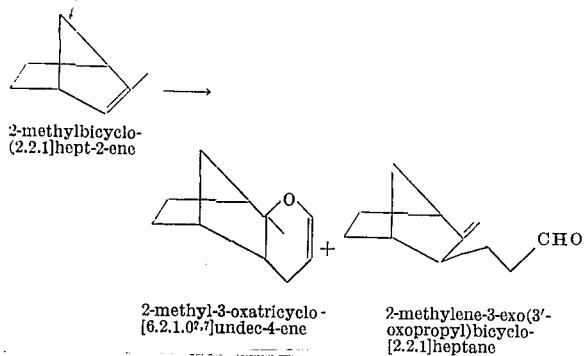

2-methylbicyclo-
(2.2.1)hept-2-ene 2-methyl-3-oxatricyclo-
[6.2.1.0²,⁷]undec-4-ene 2-methylene-3-exo(3'-
oxopropyl)bicyclo-
[2.2.1]heptane

STEP 2

Step 2 of Route II involves the reaction of 2-methylene-3-exo(3'-oxopropyl)bicyclo[2.2.1]heptane, one of the reaction products of Step 1, with (carbethoxyethylidene) triphenyl phosphorane. (Carbethoxyethylidene)triphenyl phosphorane, described hereinbefore, is condensed with the starting material in this step of the reaction in a process commonly referred to as a Wittig reaction. The reaction of 2-methylene-3-exo(3'-oxopropyl)bicyclo[2.2.1]heptane with the above phosphorane results in the formation of a mixture of the cis and trans isomers of 2-methylene-3-exo(4'-carbethoxypent-3'-enyl)bicyclo[2.2.1]heptane according to the following:

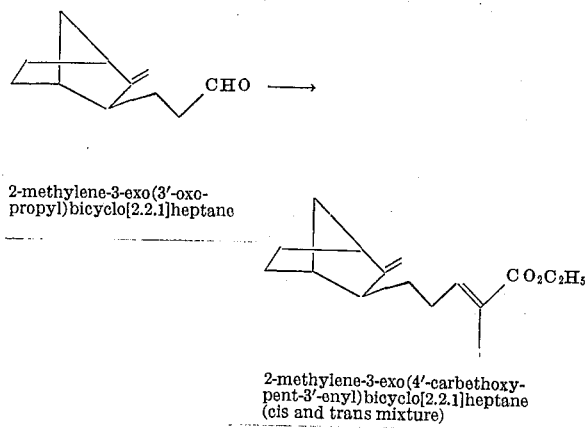

2-methylene-3-exo(3'-oxo-
propyl)bicyclo[2.2.1]heptane 2-methylene-3-exo(4'-carbethoxy-
pent-3'-enyl)bicyclo[2.2.1]heptane
(cis and trans mixture)

In Step 1 of Route I in which acrolein is reacted with 2-methylbicyclo[2.2.1]hept-2-ene, the starting material of Route 2, 2-methylene-3-exo(3'-oxopropyl)bicyclo[2.2.1]heptane is obtained along with a major amount of the starting material, 2-methyl-3-oxatricyclo[6.2.1.0²,⁷]undec-4-ene, used in Step 2 of Route I. For simplicity Route II is hereinafter described as the preparation of and the use of 2-methylene-3-exo(3'-oxo-propyl)bicyclo[2.2.1]heptane as the starting material. Where desired, the reaction product mixture from Step 1, wherein acrolein is reacted with 2-methylbicyclo[2.2.1][hept-2-ene, can be used without separation of 2-methylene-3-exo(3'-oxo-propyl)bicyclo[2.2.1]heptane from 2-methyl-3-oxatricyclo[6.2.1.0²,⁷]undec-4-ene. Route II can be used to prepare the mixture of cis- and trans-3-normethyl-β-santalol in good yield with or without the separation of the reaction products obtained in Step 1.

An olefinic double bond is formed in the side chain of the product produced in Step 2 resulting in the formation of both cis and trans isomers. The cis and trans isomers are shown as follows:

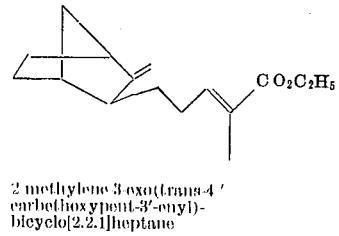

2-methylene-3-exo(trans-4'-
carbethoxypent-3'-enyl)-
bicyclo[2.2.1]heptane

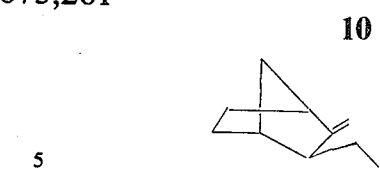

2-methylene-3-exo(cis-4'-
carbethoxypent-3'-enyl)-
bicyclo[2.2.1]heptane

In Step 2 in which the phosphorane is reacted with 2-methylene-3-exo(3'-oxopropyl)bicyclo[2.2.1 heptane, the reactants are normally used in a molar ratio of 2-methylene-3-exo(3'-oxopropyl)bicyclo[2.2.1]heptane to phosphorane of from about 1:1 to about 1:5, preferably from about 1:1 to about 1:2. Preferably, an excess of the phosphorane, e.g., 1:2, is used in order to insure that all of the aldehyde is converted to the ester. The Wittig reaction is a well known reaction and is described by G. Wittig and M. Schoellkopf and H. O. House, op. cit.

An organic solvent is preferably used in Step 2. Suitable solvents are the chlorinated hydrocarbons, such as methylene chloride, chloroform, carbon tetrachloride, and 1,2-dichloroethane; alcohols such as ethanol, methanol, propanol, iso-propanol, butanol, and pentanol; polyols such as ethylene glycol, propylene glycol, and glycerol; and ether solvents such as diethyl ether, methylethyl ether, dimethyl ether, dibutyl ether, tetrahydrofuran, 1,2-dimethoxyethane, and dioxane. Alcohols are preferred as the solvents for use in this step and ethanol is especially preferred. The starting material is generally used in a weight ratio to solvent of from about 1:2 to about 1:50, preferably from about 1:5 to about 1:10.

The temperature of the reaction can range from about 0° C. to about 50° C. The reaction is generally run at about room temperature, e.g., from about 20° C. to about 30° C. The time of the reaction depends upon the concentrations of the reactants and the reaction temperature and generally ranges from about 1 to 36 hours, more normally from about 12 to about 16 hours. Solvent mixtures of the two reactants are simply prepared, poured together, stirred, and allowed to react for the period described above. It is not necessary in this step of Route II to use an inert atmosphere, although it can be employed if desired.

STEP 3

The last step of Route II, Step 3, involves the reduction of the mixture of cis and trans isomers, formed in Step 2, with a reducing agent such as lithium aluminum hydride, in ether solvents or sodium in an alkanol solvent, potassium in an alkanol solvent, and lithium in an alkanol solvent. A mixture of cis and trans alcohols, cis-3-normethyl-β-santalol and trans-3-normethyl-β-santalol, is obtained according to the following:

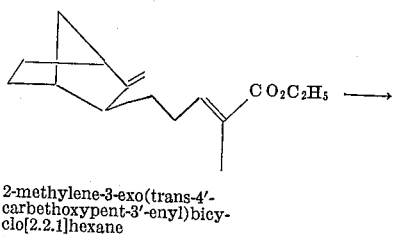

2-methylene-3-exo(trans-4'-
carbethoxypent-3'-enyl)bicy-
clo[2.2.1]hexane

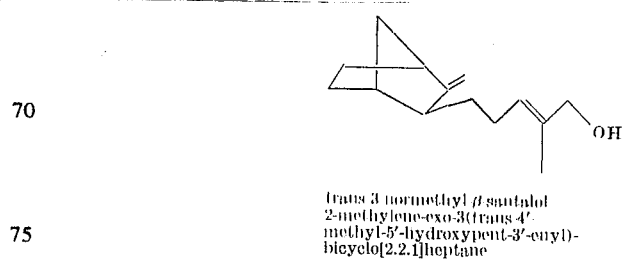

trans-3-normethyl-β-santalol
2-methylene-exo-3(trans-4'-
methyl-5'-hydroxypent-3'-enyl)-
bicyclo[2.2.1]heptane

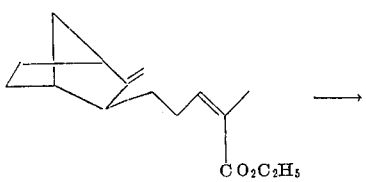

2-methylene-3-exo(cis-4'-
carbethoxypent-3'-enyl)bicy-
clo[2.2.1]hexane

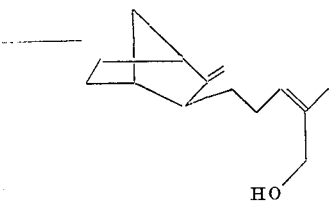

cis-3-normethyl-β-santalol
2-methylene-exo-3(cis-4'-
methyl-5'-hydroxypent-3'-enyl)-
bicyclo[2.2.1]heptane In Step 3 of Route II the reactants are generally used in equivalent amounts. Since lithium aluminum hydride has four available hydrogens for use in the reduction reaction, the molar ratio of cis and trans mixture to lithium aluminum hydride can range from about 1:0.20 to about 1:0.35. Where sodium, potassium, or lithium with an alkanol in a suitable solvent is used as the reducing agent the molar ratio of cis and trans mixture to reducing agent can range from about 1:1 to about 1:1.5.

An anhydrous organic solvent is used in Step 3 of Route II. Where lithium aluminum hydride is used as the reducing agent suitable such solvents are ether solvents, such as diethyl ether, methylethyl ether, dibutyl ether, tetrahydrofuran, 1,2-dimethoxyethane, and dioxane; aliphatic hydrocarbon solvents, such as pentane, hexane, heptane, octane, cyclopentane, cyclohexane, and cyclooctane; and aromatic hydrocarbon solvents, such as benzene, toluene, and xylene. Ether solvents are preferred and tetrahydrofuran is especially preferred. Where sodium, potassium, or lithium is used as the reducing agent, alcohol or liquid ammonia solvents are used. Suitable alcohol solvents are the alkanols methanol, ethanol, propanol, iso-propanol, butanol, and pentanol. Methanol and ethanol are preferred. The starting material, (cis and trans mixture), is generally used in the weight ratio of starting material to solvent of from about 1:5 to about 1:50, preferably from about 1:10 to about 1:20.

The temperature at which the reaction is run can range from about −50° C. to about 20° C., preferably from about −10° C. to about 5° C. The time of the reaction will be dependent upon the reactant concentrations and reaction conditions. The reaction dependent generally a rapid one requiring from about 5 minutes to about 2 hours, preferably about 30 minutes to about 1 hour. An inert atmosphere such as argon, nitrogen or helium is also used to protect the reactants from moisture. The order of addition of the reactants is not important. The solution containing the cis and trans ester mixture, is generally added to the solution containing the reducing agent as a convenience, although this is not necessary. Where desired a solution containing the reducing agent can be added to the ester.

The mixture of cis and trans-3-normethyl-β-santalol prepared according to Route I or Route II has an odor reminiscent of sandalwood oil being described as possessing a sweet and woody fragrance and thus is useful in perfume compositions in which an odor characteristic of sandalwood oil is desired. The mixture can be used at a level of from about 0.0001 to about 50 percent of the perfume composition. The odor characteristics of the santalols are described in the Givaudan Index, pp. 322–323, Givaudan-Delawanna, Inc., New York (1961). The santalols are well known as components of natural sandalwood oil.

Where desired the mixture of the two isomers can be easily separated to obtain either trans-3-normethyl-β-santalol or cis-3-normethyl-β-santalol. This separation can be easily made by conventional methods, e.g., distillation or column chromatography.

The isomers themselves are also useful as perfume components and can be used in perfume compositions at a level of about 0.001 to about 50 percent of the perfume composition. The utility of the mixture of cis and trans isomers of 3-normethyl-β-santalol and the individual isomers will be apparent on examination of Examples IV, V and VI given hereinafter.

ROUTE III

Route III Described herein relates to the preparation of 2-methylene-3-exo(4'-methyl-5'-hydroxypentyl)bicyclo[2.2.1]-heptane, a perfume component having a desirable odor reminiscent of sandalwood. In Route III, Step 1, Step 2 and Step 3 are the same as Step 1, Step 2 and Step 3 of Route I.

The starting materials employed, e.g., 2-methylbicyclo[2.2.1]hept-2-ene and acrolein, the reactants used, the reaction products obtained and the reaction products recited for Steps 1, 2 and 3 of Route I are applicable to Steps 1, 2 and 3 of Route III. Steps 1, 2 and 3 are summarized below.

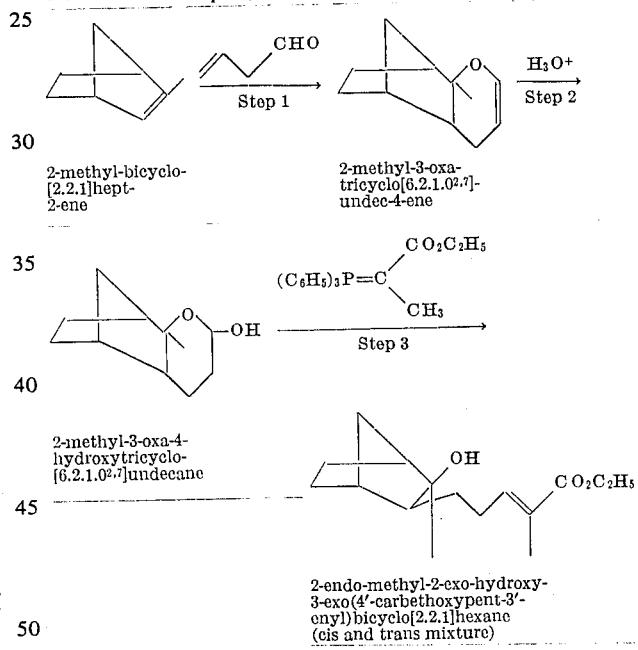

2-methyl-bicyclo-
[2.2.1]hept-
2-ene 2-methyl-3-oxa-
tricyclo[6.2.1.0²,⁷]-
undec-4-ene 2-methyl-3-oxa-4-
hydroxytricyclo-
[6.2.1.0²,⁷]undecane 2-endo-methyl-2-exo-hydroxy-
3-exo(4'-carbethoxypent-3'-
enyl)bicyclo[2.2.1]hexane
(cis and trans mixture)

STEP 4

Step 4 of Route III involves the reduction of the cis and trans mixture of 2-endo-methyl-2-exo-hydroxy-3-exo-(4'-carbethoxypent-3'-enyl)bicyclo[2.2.1]heptane with hydrogen to obtain 2-endo-methyl-2-exo-hydroxy-3-exo(4'-carbethoxypentyl)-bicyclo[2.2.1]heptane according to the following:

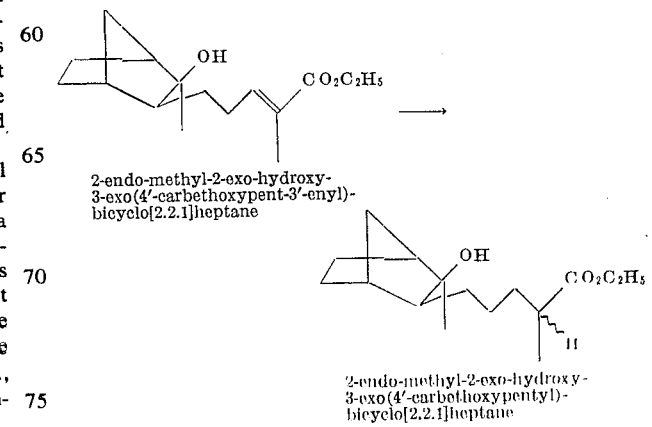

2-endo-methyl-2-exo-hydroxy-
3-exo(4'-carbethoxypent-3'-enyl)-
bicyclo[2.2.1]heptane 2-endo-methyl-2-exo-hydroxy-
3-exo(4'-carbethoxypentyl)-
bicyclo[2.2.1]heptane n the reduction of the unsaturated ester starting material the olefinic starting double bond is removed from both the cis and trans isomers of 2-endo-methyl-2-exo-hydroxy-3-exo(4'-carbethoxypent-3'-enyl)bicyclo[2.2.1]heptane.

In Step 4 generally a reaction mixture of the starting material in an organic solvent is prepared. Suitable such solvents are aromatic hydrocarbon solvents such as benzene, xylene, and toluene; aliphatic hydrocarbon solvents such as hexane, heptane, octane and decane; ether solvents such as diethyl ether, methyl ethyl ether, dimethyl ether, dibutyl ether, tetrahydrofuran, 1,2-dimethoxyethane, and dioxane; alcohol solvents such as methanol, ethanol, propanol, butanol, and pentanol; and polyfunctional solvents such as ethylene glycol, propylene glycol, and glycerol. The hydrogenation of the olefinic double bond is obtained by suspending a hydrogenation catalyst such as palladium, platinum oxide, Raney nickel, ruthenium oxide, platinum, platinum absorbed on carbon or palladium absorbed on carbon in the starting material/solvent mixture. An atmosphere of hydrogen is placed over the reaction mixture at a pressure of from 1 atmosphere to 10 atmospheres, preferably 1 to 4 atmospheres, for a period of from 0.5 to 24 hours and at a temperature of from 27° to 100° C., preferably 27° C. The presence of the hydrogen atmosphere and the hydrogenation catalyst causes the reduction of the olefinic double bond in the starting material, 2-endo-methyl-2-exohydroxy-3-exo(4'-carbethoxypent-3'-enyl)bicyclo[2.2.1]heptane to produce 2-endo-methyl-2-exo-hydroxy-3-exo(4'-carbethoxypentyl)bicyclo[2.2.1]heptane, the starting material used in Step 5 of Route III.

STEP 5

Step 5 of Route III involves the dehydration of the reaction product of Step 4, 2-endo-methyl-2-exo-hydroxy-3-exo(4'-carbethoxypentyl)bicyclo[2.2.1]heptane, with a dehydrating agent to form 2-methylene-3-exo(4'-carbethoxypentyl)bicyclo[2.2.1]heptane according to the following:

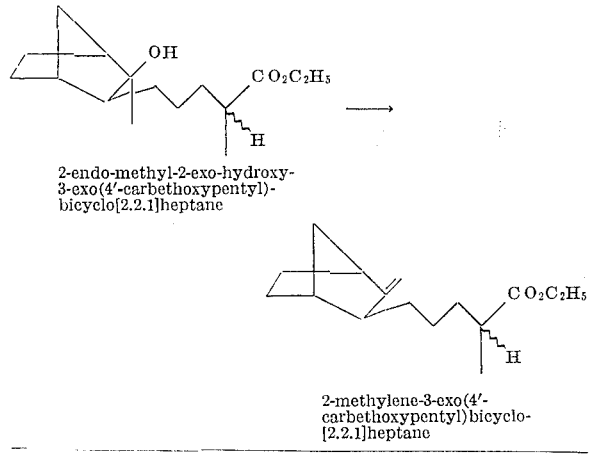

2-endo-methyl-2-exo-hydroxy-3-exo(4'-carbethoxypentyl)-bicyclo[2.2.1]heptane 2-methylene-3-exo(4'-carbethoxypentyl)bicyclo-[2.2.1]heptane Suitable dehydrating agents for use in Step 5 of Route III are thionyl chloride, phosphorus oxychloride, boron trifluoride, aluminum oxide, sulfuric acid, and p-toluene sulfonic acid. Any of these dehydrating agents can be used to transform the hydroxyl group into a methylene group. The dehydrating agents are normally used in the molar ratio of 2-endo-methyl-2-exo-hydroxy-3-exo(4'-carbethoxypentyl)bicyclo[2.2.1]heptane to dehydrating agent of from about 100:1 to about 1:20, preferably from about 1:1 to about 1:10.

The dehydrating step, Step 5, of Route III is run in an anhydrous organic solvent. Suitable anhydrous solvents for use with thionyl chloride, phosphorus oxychloride, aluminum oxide, sulfuric acid, and p-toluene sulfonic acid are halogenated hydrocarbons, such as carbon tetrachloride, chloroform, methylene chloride, and 1,2-dichloroethane; aromatic hydrocarbon solvents such as benzene, toluene, and xylene; aliphatic hydrocarbon solvents such as pentane, hexane, heptane, octane, cyclopentane, cyclohexane, and cyclooctane; and ether solvents such as diethyl ether, methylethyl ether, dibutyl ether, tetrahydrofuran, 1,2-dimethoxyethane, and dioxane. The halogenated hydrocarbon solvents are preferred for use with these dehydrating agents and of these methylene chloride is most preferred. The above-mentioned solvents are also suitable for use with boron trifluoride. Where boron trifluoride is used as the dehydrating agent ether solvents are preferred. Where thionyl chloride is used, pyridine is the preferred solvent although other solvents can also be used. Thionyl chloride is preferred as the dehydrating agent. Thionyl chloride with pyridine is especially preferred as the dehydrating agent solvent combination. The starting material is generally used in a weight ratio to the solvent of from about 1:0.5 to about 1:50, preferably from about 1:5 to about 1:20.

The temperature of this step of Route III will in general be dependent upon the type of dehydrating agent and the solvent used, but normally ranges from about −20° C. to about 50° C. With thionyl chloride, phosphorus oxychloride, aluminum oxide, sulfuric acid, and p-toluene sulfonic acid, in any of the above-mentioned solvents, the temperature of the reaction can range from about −20° C. to about 20° C. With these dehydrating agents it is preferred that the dehydrating step be run at about 0° C. for high yields. When boron trifluoride is used in an ether solvent as the dehydrating agent, a higher temperature of from about 25° C. to about 50° C., (generally the reflux temperature of the boron trifluoride/ether/starting material mixture) is used. Neither the dehydrating agent used nor the solvent employed is a critical consideration in this step of Route III and the dehydrating agent and solvent can be selected on the basis of convenience. The time of the reaction generally ranges from about 30 minutes to about 3 hours, again depending upon the reaction conditions and concentrations used. More preferably the reaction time ranges from about 1 to about 2 hours. The dehydrating reaction of Step 5 is usually conducted under an inert atmosphere such as argon, helium, or nitrogen, to prevent the contacting of moisture from the atmosphere.

STEP 6

The last step of Route III, Step 6, involves the reduction of 2-methylene-3-exo(4'-carbethoxypentyl)bicyclo[2.2.1]heptane formed in Step 5, with a reducing agent such as lithium aluminum hydride, aluminum hydride in ether solvents or sodium, potassium or lithium and alcohol according to the following:

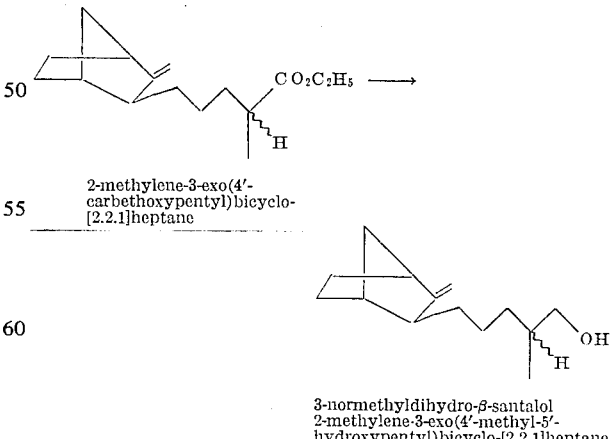

2-methylene-3-exo(4'-carbethoxypentyl)bicyclo-[2.2.1]heptane 3-normethyldihydro-β-santalol
2-methylene-3-exo(4'-methyl-5'-hydroxypentyl)bicyclo-[2.2.1]heptane In Step 6 of Route III the reactants are generally used in equivalent amounts. Since lithium aluminum hydride has four available hydrogens for use in the reduction reaction, the molar ratio of starting material to lithium aluminum hydride can range from about 1:0.20 to about 1:0.35. Where sodium, potassium, or lithium and an alkanol in a suitable solvent is used as the reducing agent the molar ratio of starting material to reducing agent can range from about 1:1 to about 1:1.5.

An anhydrous organic aprotic solvent is used in Step 6 of Route III. Where lithium aluminum hydride is used as the reducing agent suitable such solvents are ether solvents, such as diethyl ether, methylethyl ether, dibutyl ether, tetrahydrofuran, 1,2-dimethoxyethane, and dioxane; aliphatic hydrocarbon solvents such as pentane, hexane, heptane, octane, cyclopentane, cyclohexane, and cyclooctane; and aromatic hydrocarbon solvents such as benzene, toluene, and xylene. Ether solvents are preferred and tetrahydrofuran is especially preferred. Where sodium, potassium, or lithium is used as the reducing agent, alkanol solvents are used. Suitable alkanol solvents are methanol, ethanol, propanol, isopropanol, butanol, and pentanol. Methanol and ethanol are preferred. The starting material, 2-methylene-3-exo(4'-carbethoxypentyl)bicyclo[2.2.1]-heptane is generally used in the weight ratio of starting material to solvent of from about 1:5 to about 1:50, preferably from about 1:10 to about 1:20.

The temperature at which the reaction is run can range from about −50° C. to about 20° C., preferably from about −10° C. to about 5° C. The time of the reaction will be dependent upon the reactant concentrations and reaction conditions. The reaction is generally a rapid one requiring from about 5 minutes to about 2 hours, more preferably about 30 minutes to about 1 hour. An inert atmosphere such as argon, nitrogen, or helium is also used to protect the reactants from moisture. The order of addition of the reactants is not important. The solution containing the starting material is generally added to the solution containing the reducing agent as a convenience, although this is not necessary. Where desired a solution containing the reducing agent can be added to the ester.

3-Normethyldihydro-β-santalol, the product produced by Route III possesses a sweet woody fragrance reminiscent of sandalwood oil and thus is useful in perfume compositions in which an odor characteristic of sandalwood oil is desired. The mixture can be used at a level of from about 0.0001 to about 50 percent of the perfume composition. The odor characteristics of the santalols are described in the Givaudan Index, pp. 322–323, Givaudan-Delawanna, Inc., New York (1961). The santalols are well known as components of natural sandalwood oil. The utility of the 3-normethyldihydro-β-santalol will be apparent on examination of Examples IV, V and VI given hereinafter.

The examples given hereinafter are merely illustrative and are not intended to limit the spirit and scope of this invention.

EXAMPLES

GENERAL

Melting points were determined on a Thomas-Hoover melting point apparatus or on a micro hot-stage and are uncorrected; boiling points are uncorrected. Infrared spectra were recorded on a Perkin-Elmer model 257 spectrophotometer. Nuclear magnetic resonance spectra were run as 10 percent solutions in carbon tetrachloride on a Varian T–60 or HA–100 spectrometer using tetramethylsilane as an internal reference. Chemical shifts are recorded as parts per million on the $\tau$ scale, coupling constants as Hertz. Nuclear magnetic resonance are recorded in the order: chemical shift (multiplicity where $s$ = singlet, $d$ = doublet, $t$ = triplet, $q$ = quartet, $m$ = multiplet; coupling constant, integration, interpretation). Molecular weights were determined on an Atlas SM–1 or Atlas CH–4 mass spectrometer. The following columns were employed for gas chromatographic separations: Column No. 1 — 10 ft. × 0.25 in. stainless steel column packed with 20 percent silicone SF96 coated on 60/80 mesh Chromosorb W–DMCS–A/; Column No. 2 — 10 ft. × 0.25 in. stainless steel column packed with 20 percent FFAP coated on 60/80 mesh Chromosorb W–DMCS–A/W; Column No. 3 — 10 ft. × 0.25 in. stainless steel column packed with 20 percent Carbowax 20M coated on 60/80 mesh Chromosorb W. Retention times are recorded relative to air.

EXAMPLE I

Preparation of 2-Methylene-3-exo(trans-4'-methyl-5'-hydroxypent-3'-enyl)bycyclo[2.2.1]heptane,trans-3-Normethyl-β-santalol, and 2-Methylene-3-exo(cis-4'-methyl-5'-hydroxypent-3'-enyl)bicyclo[2.2.1]heptane, cis-3-Normethyl-β-santalol — Route I a. Preparation of Starting Material 1. 2-Methylbicyclo[2.2.1]hept-2-ene, the starting material used, was prepared according to the method of K. Alder and H. J. Ache, Chem. Ber., 95, 503 (1962), in which condensation of 80.0 g. of methylcyclopentadiene dimer and a large excess of ethylene affords 38.0 g. (35 percent of 2-methylbicyclo[2.2.1]hept-2-ene as a colorless liquid, b.p. 115°–117° C. (760 mm. Hg) (spinning band). Gas chromatographic analyses on column No. 1 at 85° C. with a helium flow of 60 ml./min. showed 2-methylbicyclo[2.2.1]hept-2-ene (96 percent).

b. Preparation of 2-Methyl-3-oxatricyclo[6.2.1.0$^{2,7}$]-undec-4-ene — Step 1.

A mixture of 2-methylbicyclo[2.2.1]hept-2-ene 81 g. (0.75 mole), acrolein 28 g. (0.5 mole), and hydroquinone 0.055 g. (5 × 10$^{-4}$ mole) was undec-in a sealed glass tube and heated at 200° C. in a rocking autoclave for 8.0 hr. Distillation of the residue through a 25 cm. Vigreaux column afforded 39.0 g. (45 percent) of colorless liquid, b.p. 93°–100° C. (10 mm. Hg). Gas chromatographic analysis on column No. 2 at 200° C. with a helium flow of 60 ml./min. showed two major peaks: peak No. 1, 2-methyl-3-oxatricyclo[6.2.1.0$^{2,7}$]undex-4-ene (92.8 percent) relative retention time 4.0 min.; and peak No. 2, 2-methylene-3-exo(3'-oxopropyl)bicyclo[2.2.1]heptane (7.2 percent) relative retention time 8.5 min.

A sample of the first peak collected by preparative glpc (gas liquid phase chromatograph) showed the following spectral data: ir (neat) 3,050, 1,660 cm.$^{-1}$ (olefin) and strong absorption from 1,260–1,020 cm.$^{-1}$ (ether); nmr (CDCl$_3$) $\tau$ 3.82 ($d$, J = 6.0 Hz further split by long range coupling of 1–2 Hz, 1H, C–4 proton; $\tau$ 5.39 ($m$, 1H, C–5 proton); $\tau$ 8.80 ($s$, 3H, C–2 methyl). The mass spectrum showed a parent m/e 164.

Anal. Calcd. for C$_{11}$H$_{16}$O: C, 80.5; H, 9.8. Found: C, 80.2; H, 9.8.

The second peak, relative retention time 8.5 min. was collected and exhibited the following spectral data: ir (CCl$_4$) 3,062, 1,665, 886 cm.$^{-1}$ (olefin); 2,810, 2,710, 1,738 cm.$^{-1}$ (CHO); nmr (CDCl$_3$) (HA–100) $\tau$ 0.33 ($t$, J = 1 Hz, 1H, aldehydic proton), $\tau$ 5.23 and 5.46 ($s$, 1 proton each, terminal olefinic protons); $\tau$ 7.37 ($s$-broad, 1H, C–1 bridgehead proton); $\tau$ 7.59 ($t$, J = 7.0 Hz, 2H, CH$_2$CHO): $\tau$7.91 ($s$-broad, 1H, C–4 bridgehead proton). The mass spectrum showed a parent m/e 164.

c. Preparation of 2-Methyl-3-oxa-4-hydroxytricyclo-[6.2.1.0$^{2,7}$b]undecane - Step 2.

To a solution of 700 mg. (4.25 × 10$^{-3}$ mole) of 2-endo-methyl-3-oxatricyclo[6.2.1.0$^{2,7}$]undec-4-ene in 20 ml. of tetrahydrofuran was added 3 ml. (0.116 mole) of water, 0.5 ml. of sulfuric acid (98 percent) and this mixture was stirred for 4 hr. at 27° C. The reaction mixture was poured into 40 ml. of water, diluted with 75 ml. of ether and the layers separated. The etheral layer was washed with water (4 times with 30 ml.) and dried over magnesium sulfate. Evaporation of the ether afforded 572 mg. of a viscous light yellow liquid. Distillation from a modified Hickman still afforded 260 mg. (25 percent) of a colorless liquid, b.p. 80°–100° C. (0.1 mm. Hg). Gas chromatographic analysis on column No. 3 at 230° C. with a helium flow rate of 100 ml./min. showed the hemiacetal, 2-methyl- 3-oxa-4-hydrocytricyclo[6.2.1.0$^{2,7}$]undecane, relative retention time 14.0 min. (74 percent). A sample collected by preparative glpc showed: ir (CCl$_4$) adsorption at 3,380 cm.$^{-1}$ (OH) and absence of olefin at 1,660 cm.$^{-1}$. nmr (CDCl$_3$) (HA–100) $\tau$ 4.90 ($m$, 1H, acetal proton); $\tau$ 8.62 ($s$, C–2 methyl); $\tau$ 7.8–9.2 ($m$, remaining protons).

Anal. Calcd. for C$_{11}$H$_{18}$O: C, 72.5; H, 9.9. Found: C, 72.6; H, 10.0.

d. Preparation of cis- and trans-2-endo-Methyl-2-exo-hydroxy-3-exo(4'-carbethoxypent-3'-enyl)-bicyclo[2.2.1]heptane — Step 3.

To a solution of 43.0 g. (0.12 mole) of the carbethoxyethylidenetriphenyl phosphorane in 175 ml. anhydrous dimethyl sulfoxide (argon atmosphere) was added 18.6 g. (0.102 mole) of the 2-methyl-3-oxa-4-hydroxytricyclo[6.2.1.0$^{2,7}$]undecane and this mixture was stirred for 88 hr. at 60° C. After cooling to 27° C. the reaction was poured into 200 ml. ice water and the resulting oil extracted with hexane (2 × 200 ml.). The hexane layers were combined and washed with 10 percent HCl (1 × 50 ml.) and water (2 × 50 ml.). The hexane layer was filtered to remove solid triphenylphosphine oxide and again washed with 10 percent HCl (1 × 100 ml.), water (4 × 100 ml.) and dried over magnesium sulfate. Evaporation of the hexane afforded 11.37 g. of a yellow liquid. This liquid was adsorbed on a chromatographic column packed with 100 g. activated grade 12 silica gel. Elution with 1,200 ml. hexane afforded 10 g. (39 percent) of the crude cis- and trans-2-endo-methyl-2-exo-hydroxy-3-exo-(4'-carbethoxypent-3'-enyl)bicyclo[2.2.1]heptane.

e. Preparation of cis- and trans-2-methylene-3(4'-carbethoxypent-3'-enyl)bicyclo[2.2.1]heptane — Step 4.

To a solution of 6.64 g. (2.48 × 10$^{-2}$ mole) of the cis and trans mixture from Step 3 above in 100 ml. of hexane (under argon) at 0° C. was added dropwise (15 min.) a cold (0° C.) solution of 14 g. (0.12 mole) of thionyl chloride in 9.5 g. (0.12 mole) of pyridine. The reaction mixture was stirred for 2 hr. at 0° C. and the excess thionyl chloride destroyed by the dropwise addition of 40 ml. of ice water. The reaction mixture was diluted with 100 ml. of hexane and the hexane layer separated. The hexane layer was washed with water (five times with 50 ml.), 10 percent sodium carbonate (once with 50 ml.), water (three times with 50 ml.) and dried over magnesium sulfate. The solvent was evaporated and the residue dissolved in 100 ml. pyridine and heated at 115° C. for 2.5 hr.

The cooled reaction mixture was poured into 200 ml. of water and the organic material extracted with ether (three times with 100 ml.). The ethereal layers were combined and washed with water (four times with 50 ml.), 5 percent HCl (twice with 25 ml.), water (three times with 50 ml.), and dried over magnesium sulfate. Evaporation of the solvent afforded 4.60 g. of a colorless liquid. Distillation from a short-path still afforded 2.92 g. (48.5 percent) of colorless liquid, b.p.89° to 100° C. (0.01 mm. Hg.). Gas chromatographic analysis on column No. 1 at 225° C. with a helium flow rate of 60 ml./min. showed two peaks, the cis-ester (10.5 percent) relative retention time 11.3 min. and the trans-ester (74.5 percent) relative retention time 16.3 min.

A sample of the cis-ester, 2-methylene-3(4'-carbethoxypent-3'-enyl)bicyclo[2.2.1]heptane collected by preparative glpc showed the following: ir (neat) 3,062, 1,664, 882 cm.$^{-1}$ (olefin) and 1,725 cm.$^{-1}$ (unsaturated ester); nmr (CDCl$_3$) (T−60) $\tau$ 4.15 ($t$, J = 7 Hz, 1H, internal olefinic proton), $\tau$ 5.23 and $\tau$ 5.47 ($s$, 1H each, terminal olefinic protons); $\tau$ 5.87 ($q$, J = 8 Hz, 2H, —COOCH$_2$CH$_3$); $\tau$ 7.3–8.0 ($m$, 4H, C–1, C–4 bridgehead protons and allyl protons); $\tau$ 8.15 ($s$, 3H, vinyl methyl protons); $\tau$ 8.27–9.0 ($m$, 12 H, remaining protons). The mass spectrum showed parent $m/e$ 248.

Anal. Calcd. for C$_{16}$H$_{24}$O$_2$: C, 77.5; H, 9.7. Found: C, 77.5; H, 10.0.

A sample of the second peak (trans-ester), relative retention time 16.3 min. was collected by preparative glpc and showed the following: ir (neat) 3,060, 1,660, 882 cm.$^{-1}$ (olefin) and 1,720 cm.$^{-1}$ (unsaturated ester carbonyl); nmr (T−60) $\tau$ 3.33 ($t$, J = 8.0 Hz, 1H, internal vinyl proton); $\tau$ 5.17 and 5.43 ($s$, 1H each, terminal vinyl protons); $\tau$ 5.87 ($q$, J = 7.0 Hz, 2H, CO$_2$CH$_2$CH$_3$); $\tau$ 7.3–8.0 ($m$, 4H, C–1, C–4 bridgehead and the allyl protons); $\tau$ 8.17 ($s$, 3H, vinyl methyl protons); $\tau$ 8.20–9.0 ($m$, 12H, remaining protons). The mass spectrum showed parent $m/e$ 248.

An oxygen-free solution of 3.0 g. of the ester mixture (ratio cis to trans 1:7) prepared in Step 4 above in 200 ml. cyclohexane was irradiated in an argon atmosphere with a 200 Watt Hanovia mercury arc lamp using a Vycor filter for 2.75 hr. to change the relative ratio of cis to trans isomer. The cyclohexane was evaporated to yield 2.91 g. of a light yellow liquid.

Gas chromatographic analysis on column No. 2 at 225° C. with a helium flow of 60 ml./min. showed the cis-ester, relative retention time 11.6 min.; and the trans-ester, relative retention time 16.7 min., in the ratio 1:1.1.

f. Preparation of cis- and trans-2-Methylene-3-exo(4'-methyl-5'-hydroxypent-3'-enyl)bicyclo[2.2.1]heptane, cis- and trans-Normethyl-β-santalol — Step 5.

To a stirred suspension of 380 mg. (1 × 10$^{-2}$ mole) of lithium aluminum hydride in 20 ml. absolute ether at 27° C., under an argon atmosphere, was added dropwise over a 10 min. period a solution of 1.33 g. (1 × 10$^{-2}$ mole) aluminum chloride in 20 ml. absolute ether. After stirring for an additional 10 min. a solution of 2.5 g. (1 × 10$^{-2}$ mole) of the ester mixture (obtained after irradiation with ultraviolet light and having a cis:trans ratio of 1:1.1) in 20 ml. absolute ether was added dropwise over a 10 min. period. The reaction was stirred for an additional 45 min. and cooled to 0° C. The remaining lithium aluminum hydride was destroyed by the dropwise addition of 10 ml. of ice water. The reaction mixture was diluted with 100 ml. of ether and the layers separated. The ethereal layer was washed with water (twice with 20 ml.), 10 percent HCl (twice with 40 ml.), water (four times with 30 ml.) and dried over magnesium sulfate. Evaporation of the ether afforded 1.45 g. light yellow liquid. Distillation through a short-path apparatus afforded 797 mg. of a colorless liquid, b.p. 96°–100° C. (0.05 mm. Hg) (31 percent). Gas chromatographic analysis on column No. 2 at 225° C. with a helium flow of 60 ml./min. showed the presence of 2-methylene-3-exo(cis-4'-methyl-5'-hydroxypent-3'-enyl)bicyclo[2.2.1]heptane, cis-normethyl-β-santalol, (37.8 percent) relative retention time 20.3 min. and 2-methylene-3-exo(trans-4'-methyl-5'-hydroxypent-3'-enyl)bicyclo[2.2.1]heptane, trans-normethyl-β-santalol, (41.5 percent) relative retention time 21.9 min. in the ratio of 1:1.1.

A sample of cis-normethyl-β-santalol was collected by preparative glpc and showed the following: ir(neat) 3,305, 1,005 cm.$^{-1}$ (OH); 3,060, 1,665, 880 cm.$^{-1}$ (olefin): nmr (HA–100) $\tau$ 4.87 ($t$, J = 7 Hz, 1H, internal vinyl proton); $\tau$ 5.30 and 5.54 ($s$, 1H each terminal vinyl protons); $\tau$ 6.04 ($s$, 2H, CH$_2$OH protons); $\tau$ 7.83–8.0 ($m$, 3H, C–4 bridgehead and allyl protons overlapping); $\tau$ 8.27 ($s$, 3H, vinyl methyl); $\tau$ 8.30–9.0 ($m$, 9H, remaining protons). The mass spectrum showed parent $m/e$ 206. The compound had a sweet and woody fragrance reminiscent of sandalwood oil.

Anal. Calcd. for C$_{14}$H$_{22}$O: C, 81.5; H, 10.7. Found: C, 81.4; H, 10.8.

A sample of trans-normethyl-β-santalol was collected by preparative glpc and showed the following: ir(neat) 3,320, 1,010 cm.$^{-1}$ (OH); 3,060, 1,665, 880 cm.$^{-1}$ (olefin): nmr (HA–100) $\tau$ 4.76 ($m$, 1H, internal vinyl proton); $\tau$ 5.30 and 5.55 ($s$, 1H, each, terminal vinyl protons); $\tau$ 6.2 ($s$, 2H, CH$_2$—OH); $\tau$ 6.85 ($s$, 1H, OH proton); $\tau$ 7.43 ($s$-broad, 1H, C–1 bridgehead proton); $\tau$ 7.82–8.02 ($m$, 3H, C–4 bridgehead and allyl protons, overlapping); $\tau$ 8.41 ($s$, 3H, vinyl methyl proton); $\tau$ 8.45–9.0 ($m$, 9H, remaining protons). The mass spectrum showed a parent $m/e$ 206. The compound had a sweet and woody fragrance reminiscent of sandalwood oil.

Anal. Calcd. for C$_{14}$H$_{22}$O: C, 81.5; H, 10.7. Found: C, 81.9; H, 11.0.

EXAMPLE II

Preparation of cis- and trans-2-Methylene-3-exo(4'-methyl-5'-hydroxypent-3'[2.2.1]heptane, cis- and trans-3-Normethyl-βsantalol — Route II a. Preparation of 2-Methylene-3-exo(3'-oxopropyl)bicyclo[2.2.1]heptane and 2-Methyl-3-oxatricyclo[6.2.1.0$^{2,7}$]-undec-4-ene — Step 1.

The procedure of Example I(a), (b), and (c) was repeated with a mixture of 2-methylene-3-exo(3'-oxopropyl)bicyclo[2.2.1]-heptane and 2-methyl-3-oxatricyclo[6.2.1.0$^{2,7}$]undec-4-ene being obtained.

b. Preparation of cis- and trans-2-Methylene-3-exo-(4'-carbethoxypent-3'-enyl)bicyclo[2.2.1]heptane — Step 2.

To a suspension of 18.0 g. (5.5 × 10$^{-2}$ mole) of carbethoxyethylidenetriphenyl phosphorane (Aldrich Chem. Co.) in 50 ml. absolute ethanol was added 11.3 g. of a mixture containing 75 percent of 2-methyl-3-oxatricyclo[6.2.1.0$^{2,7}$]undec-4-ene and 25 percent of 2-methylene-3-exo(3'-oxopropyl)bicyclo[2.2.1]heptane prepared in (a) above. The reaction mixture was stirred for 17 hr. at 27° C. and the ethanol was evaporated to afford a yellowish semi-solid residue. This residue was triturated with hexane (three times with 50 ml.) and the hexane solution decanted. The hexane solution was concentrated to approximately 50 ml. and cooled to −70° C. The hexane was decanted from the precipitated white solid, and washed with water (once with 20 ml.), 10 percent HCl (twice with 20 ml.), water (four times with 20 ml.), and dried over magnesium sulfate. Evaporation of the hexane yielded 9.6 g. of yellow liquid. Distillation in a Kontes short-path distillation apparatus afforded 3.16 g. (69 percent, based on 2-methylene-3-exo(3'-oxopropyl)bicyclo[2.2.1]heptane present in the original mixture) of colorless liquid, b.p. 100°–110° C. (0.05 mm. Hg). Gas chromatographic analysis on column No. 2 at 225° C. with a helium flow of 60 ml./min. showed the cis-ester, 2-methylene-3-exo(cis-4'-carbethoxypent-3'-enyl)bicyclo[2.2.1]heptane (10.5 percent)( Relative retention time 11.3 min., and the trans-ester, 2-methylene-3-exo(trans-4'-carbethoxypent-3'-enyl)bicyclo-[2.2.1]heptane (74.5 percent), relative retention time 16.3 min.

A sample of the peak with relative retention time, 11.3 min. (cis-ester), was collected by preparative glpc and had the following spectral data: ir(neat) 3,062, 1,664, 882 cm.$^{-1}$ (olefin) and 1,725 cm.$^{-1}$ (unsaturated ester carbonyl); nmr (T-60) τ 4.15 (t, J = 7 Hz, 1H, internal vinyl proton), τ 5.23 and τ 5.47 (s, 1H each, terminal vinyl protons); τ 5.87 (q, J = 8 Hz, 2H, CO$_2$CH$_2$CH$_3$); τ 7.3–8.0 (m, 4H, C–1, C–4 bridgehead protons and allyl protons); τ 8.15 (s, 3H, vinyl methyl protons); τ 8.27–9.0 (m, 12H, remaining protons). The mass spectrum showed parent m/e 248.

Anal. Calcd. for C$_{16}$H$_{24}$O$_2$: C, 77.5; H, 9.7. Found: C, 77.5; H, 10.0.

A sample of the second peak (trans-ester), relative retention time 16.3 min., was collected by preparative glpc and showed the following: ir(neat) 3,060, 1,660, 882 cm.$^{-1}$ (olefin) and 1,720 cm.$^{-1}$ unsaturated ester carbonyl); nmr (T–60) τ 3.33 (t, J = 8.0 Hz, 1H, internal vinyl proton); τ 5.17 and 5.43 (s, 1H each, terminal vinyl protons); τ 5.87 (q, J = 7.0 Hz, 2H, CO$_2$CH$_2$CH$_3$); τ 7.3–8.0 (m, 4H, C–1, C–4 bridgehead and the allyl protons); τ 8.17 (s, 3H, vinyl methyl protons); τ 8.2–9.0 (m, 12H, remaining protons). The mass spectrum showed parent m/e 248.

Anal. Calcd. for C$_{16}$H$_{24}$O$_2$: C, 77.5; H, 9.7. Found: C, 77.3; H, 9.7.

An oxygen-free solution of 3.0 g. of the ester mixture prepared above (ratio cis to trans 1:7) in 200 ml. of cyclohexane was irradiated in an argon atmosphere with a 200 watt Hanovia mercury arc lamp using a Vycor filter for 2.75 hr. The cyclohexane was evaporated to yield 2.91 g. of a light yellow liquid. Gas chromatographic analysis on column No. 2 at 225° C. with a helium flow of 60 ml./min. showed the cis-ester, relative retention time 11.6 min.; and the trans-ester, relative retention time 16.7 min., in the ratio 1:1.1.

c. Preparation of cis- and trans-2-Methylene-3-exo-(4'-methyl-5'-hydroxypent-3'-enyl)bicyclo[2.2.1]-heptane, cis- and trans-Normethyl-β-santalol — Step 3.

To a stirred suspension of 380 mg. (1 × 10$^{-2}$ mole) of lithium aluminum hydride in 20 ml. absolute ether at 27° C., under an argon atmosphere, was added dropwise over a 10 min. period a solution of 1.33 g. (1 × 10$^{-2}$ mole) of aluminum chloride in 20 ml. absolute ether. After stirring for an additional 10 min. a solution of 2.5 g. (1 × 10$^{-2}$ mole) of the ester mixture (cis/trans ratio 1:1.1 obtained by irradiating the mixture of Step 2 above with ultraviolet light) in 20 ml. of absolute ether was added dropwise over a 10 min. period. The reaction was stirred for an additional 45 min. and cooled to 0° C. The remaining lithium aluminum hydride was destroyed by the dropwise addition of 10 ml. of ice water. The reaction mixture was diluted with 100 ml. of ether and the layers separated. The ethereal layer was washed with water (twice with 20 ml.), 10 percent HCl (twice with 40 ml.), water (four times with 30 ml.) and dried over magnesium sulfate. Evaporation of the ether afforded 1.45 g. of a light yellow liquid. Distillation through short-path apparatus afforded 797 mg. of a colorless liquid, b.p. 96°–100° C. (0.05 mm. Hg) (31 percent). Gas chromatographic analysis on column No. 2 at 225° C. with a helium flow of 60 ml./min. showed the presence of 2-methylene-3-exo(cis-4'-methyl-5'-hydroxypent-3'-enyl)bicyclo[2.2.1]heptane, cis-normethyl-β-santalol, (37.8 percent) relative retention time 20.3 min. and 2-methylene-3-exo(trans-4'-methyl-5'-hydroxypent-3'-enyl)bicyclo[2.2.1]heptane, trans-normethyl-β-santalol, (41.5 percent) relative retention time 21.9 min. in the ratio of 1:1.1.

A sample of cis-normethyl-β-santalol was collected by preparative glpc and showed the following: ir(neat) 3,305, 1,005 cm.$^{-1}$ (OH); 3,060, 1,665, 880 cm.$^{-1}$ (olefin): nmr (HA-100) τ 4.87 (t, J = 7 Hz. 1H, internal vinyl proton); τ 5.30 and 5.54 (s, 1H each terminal vinyl protons); τ 6.04 (s, 2H, CH$_2$OH protons); τ 7.35 (s, 1H, OH); τ 7.43 (s-broad, 1H, C–1 bridgehead proton); τ 7.83–8.0 (m, 3H, C–4 bridgehead and allyl protons overlapping); τ 8.27 (s, 3H, vinyl methyl); τ 8.30–9.0 (m, 9H, remaining protons). The mass spectrum showed a parent m/e 306.

Anal. Calcd. for C$_{14}$H$_{22}$O: C, 81.5; H, 10.7. Found: C, 81.4; H, 10.8.

A sample of trans-normethyl-β-santalol was collected by preparative glpc and showed the following: ir(neat) 3,320, 1,010 cm.$^{-1}$ (olefin): nmr (HA-100) τ 4.76 (m, 1H, internal vinyl proton); τ 5.30 and 5.55 (s, 1H each, terminal vinyl protons); τ 6.2 (s, 2H, CH$_2$—OH; τ 6.85 (s, 1H, OH proton); τ 7.43 (s-broad, 1H, C–1 bridgehead proton); τ 7.82–8.02 (m, 3H, C–4 bridgehead and allyl protons, overlapping); τ8.41 (s, 3H, vinyl methyl proton); τ 8.45–9.0 (m, 9H, remaining protons). The mass spectrum showed a parent m/e 206.

Anal. Calcd. for C$_{14}$H$_{22}$O: C, 81.5; H, 10.7. Found: C, 81.9; H, 11.0.

EXAMPLE III

Preparation of 2-Methylene-3-exo(4'-methyl-5'-hydroxypentyl)bicyclo[2.2.1]heptane, 3-Normethyldihydro-β-santalol — Route III.

a. Preparation of 2-Methyl-3-oxatricyclo[6.2.1.0$^{2,7}$]-undec-4-ene — Step 1.

The procedure of Example I (a) and (b) was repeated to obtain 2-methyl-3-oxatricyclo[6.2.1.0$^{2,7}$]undec-4-ene by reacting 2-methylbicyclo[2.2.1]hept-2-ene with acrolein.

b. Preparation of 2-Methyl-3-oxa-4-hydroxytricyclo[6.2.1.0$^{2,7}$]undecane — Step 2.

To a solution of 700 mg. (4.25 × 10$^{-3}$ mole) of 2-methyl-3-oxatricyclo[6.2.1.0$^{2,7}$]undec-4-ene prepared as in (a) above in 20 ml. of tetrahydrofuran was added 3 ml. (0.166 mole) of water, 0.5 ml. of sulfuric acid (98 percent) and this mixture was stirred for 4 hr. at 27° C. The reaction mixture was poured into 40 ml. of water, diluted with 75 ml. of ether and the layers separated. The ethereal layer was washed with water (four times with 30 ml.) and dried over magnesium sulfate. Evaporation of the ether afforded 572 mg. of a viscous light yellow liquid. Distillation from a modified Hickman still afforded 260 mg. (25 percent) of a colorless liquid, b.p. 80°–100 ° C. (0.1 mm. Hg). Gas chromatographic analysis on column No. 2 at 230° C. with a helium flow rate of 100 ml./min. showed 2-methyl-3-oxa-4-hydroxytricyclo[6.2.1.0$^{2,7}$]undecane, relative retention time 14.0 min. (74 percent). A sample collected by preparative glpc showed: ir(CCl$_4$) absorption at 3,380 cm.$^{-1}$ (OH) and absence of olefin at 1,660 cm.$^{-1}$. Nmr (HA-100) τ 4.90 (m, 1H, acetal proton); τ 8.62 (s, C–2 methyl); τ 7.8–9.2 (m, remaining protons).

Anal. Calcd. for C$_{11}$H$_{18}$O: C, 72.5; H, 9.9. Found: C, 72.6; H, 10.0.

c. Preparation of cis- and trans-2-endo-Methyl-2-exo-hydroxy-3-exo(4'-carbethoxypent-3'-enyl)-bicyclo[2.2.1]heptane — Step 3.

To a solution of 43.0 g. (0.12 mole) of carbethoxyethylidenetriphenylphosphorane in 175 ml. of anhydrous dimethyl sulfoxide (argon atmosphere) was added 18.6 g. (0.012 mole) of 2-methyl-3-oxa-4-hydroxytricyclo[6.2.1.0$^{2,7}$]undecane prepared as in (b) above and this mixture was stirred for 88 hr. at 60° C. After cooling to 27° C. the reaction was poured into 200 ml. of ice water and the resulting oil extracted with hexane (twice with 200 ml.). The hexane layers were combined and washed with 10 percent HCl (once with 50 ml.) and water (twice with 50 ml.). The hexane layer was filtered and again washed with 10 percent HCl (once with 100 ml.), water (four times with 100 ml.) and dried over magnesium sulfate. Evaporation of the hexane afforded 11.37 g. of a yellow liquid. This liquid was adsorbed on a chromatographic column packed with 100 g. of activated grade 12 silica gel. Elution with 1,200 ml. of hexane afforded 10 g. (39 percent) of the crude cis- and trans-2-endo-methyl-2-exo-hydroxy-3-exo(4'-carbethoxypent-3'-enyl)bicyclo[2.2.1]heptane. This mixture was used in the following step without further purification.

d. Preparation of 2-endo-Methyl-2-exo-hydroxy-3-exo(4'-carbethoxypentyl)bicyclo[2.2.1]heptane — Step 4.

To a solution of 9.70 g. (4 × 10$^{-2}$ mole) of the crude mixture of cis- and trans-esters prepared as in (c) above in 100 ml. of absolute ethanol was added a suspension of 100 mg. of platinum oxide in 5 ml. of absolute ethanol. The reaction mixture was shaken for 16 hr. under a hydrogen atmosphere (50 psi.) on a Parr hydrogenation apparatus. The platinum oxide was removed by filtration and the ethanol evaporated to afford 6.64 g. (66.4 percent) of 2-endo-methyl-2-exo-hydroxy-3-exo(4'-carbethoxypentyl)bicyclo[2.2.1]heptane. The ir spectrum showed absorption for saturated ester (1,735 cm.$^{-1}$) and absence of absorption 1,660 cm.$^{-1}$ (olefin). This crude material was used in the following step without further purification.

e. Preparation of 2-Methylene-3-exo(4'-carbethoxypentyl)bicyclo[2.2.1]heptane — Step 5.

To a solution of 6.64 g. (2.48 × 10$^{-2}$ mole) of the reaction product prepared as in (d) above in 100 ml. of hexane (under argon) at 0° C. was added dropwise (15 min.) a cold (0° C.) solution of 14 g. (0.12 mole) of thionyl chloride in 9.5 g. (0.12 mole) of pyridine. The reaction mixture was stirred for 2 hr. at 0° C. and the excess thionyl chloride destroyed by the dropwise addition of 40 ml. of ice water. The reaction mixture was diluted with 100 ml. of hexane and the hexane layer separated. The hexane layer was washed with water (five times with 50 ml.), 10 percent sodium carbonate (once with 50 ml.), water (three times with 50 ml.) and dried over magnesium sulfate. The solvent was evaporated and the residue dissolved in 100 ml. of pyridine and heated at 115° C. for 2.5 hr.

The cooled reaction mixture was poured into 200 ml. of water and the organic material extracted with ether (three times with 100 ml.). The ethereal layers were combined and washed with water (four times with 50 ml.), 5 percent HCl (twice with 25 ml.), water (three times with 50 ml.) and dried over magnesium sulfate. Evaporation of the solvent afforded 4.60 g. of a brown liquid. Distillation from a short-path still afforded 2.92 g. (48.5 percent) of a colorless liquid, b.p. 89°–100° C. (0.01 mm. Hg.). Gas chromatographic analysis on column No. 1 at 225° C. with a helium flow rate of 60 ml./min. showed 2-methylene-3-exo(4'-carbethoxypentyl)bicyclo[2.2.1]heptane (80 percent), relative retention time 7.3 min. A sample of this product collected by preparative glpc showed the following: ir(neat) 1,740 cm.$^{-1}$ (C=O); 3,070, 1,660, 882 cm.$^{-1}$ (olefin); nmr (HA–100) τ 5.28 and 5.53 (s, 1H each, vinyl protons); τ 5.96 (q, J = 7 Hz, 2H, CO$_2$CH$_2$CH$_3$); τ 7.42 (s-broad, 1H, C–1 bridgehead proton); τ 7.89 (s-broad, 1H, C–4 bridgehead proton); τ 8.0–9.0 (m, 20H, remaining protons). The mass spectrum showed a parent m/e 250.

Anal. Calcd. for C$_{16}$H$_{26}$O$_2$: C, 76.8; H, 10.4. Found: C, 76.8; H, 10.4.

f. Preparation of 2-Methylene-3-exo(4'-methyl-5'-hydroxypentyl)bicyclo[2.2.1]heptane, 3-Normethyldihydro-β-santalol — Step 6.

To a stirred suspension of 380 mg. (1.0 × 10$^{-2}$ mole) of lithium aluminum hydride in 80 ml. of anhydrous ether at 0° C. and under an argon atmosphere was added dropwise a solution of 2.0 g. (8.0 × 10$^{-3}$ mole) of 2-methylene-3-exo-4'-carbethoxypentyl)-bicyclo[2.2.1]heptane prepared as in (e) above in 20 ml. of ether. The reaction mixture was stirred for 1 hour at 0° C. The excess lithium aluminum hydride destroyed by the dropwise addition of 10 ml. of ice water. The layers were separated and the ethereal layer washed with water (four times with 50 ml.), 5 percent HCl (once with 25 ml.), water (three times with 50 ml.) and dried over magnesium sulfate. Evaporation of the ether afforded 1.39 g. of a light yellow liquid. Distillation through a short-path still afforded 0.826 g. (49.5 percent) of a colorless liquid, b.p. 96°–100° C. (0.05 mm. Hg.). Gas chromatographic analysis on column No. 2 at 225° C. with a helium flow rate of 60 ml./min. showed 2-methylene-3-exo(4'-methyl-5'-hydroxypentyl)bicyclo[2.2.1]heptane, 3-normethyldihydro-β-santalol (99 percent) relative retention time 13.3 min.

A sample was collected by preparative glpc and showed the following: ir(neat) 3,335, 1,040 cm.$^{-1}$ (OH; 3,070, 1,660, 880 cm.$^{-1}$ (olefin): nmr (HA–100) τ 5.31 and 5.55 (s, 1H each, vinyl protons); τ 6.70 (m, 2H, CH$_2$—OH); τ 7.46 (s, 2H, OH proton superimposed with the C–1 bridgehead proton); τ 7.88 (s, 1H, C–4 bridgehead proton; τ 9.12 (d, J = 7 Hz, 3H, methyl). The mass spectrum showed a parent m/e 208.

Anal. Calcd. for C$_{14}$H$_{24}$O: C, 80.8; H, 11.5. Found: C, 80.7; H, 11.5. The compound had a sweet woody fragrance reminiscent of sandalwood oil.

EXAMPLE IV

PERFUME COMPOSITIONS

Perfume compositions containing mixture of the cis and trans isomers of 3-normethyldihydro-β-santalol, cis-3-normethyl-β-santalol and trans-3-normethyl-β-santalol are prepared by intermixing the components shown below. The compositions exhibit highly desirable and useful odors.

COMPOSITION A

| Sandal | |
|---|---|
| 3-Normethyldihydro-β-santalol | 40.0 |
| Geranium Bourbon | 15.0 |
| Vetivert | 3.0 |
| Patchouli | 1.0 |
| Olibanum | 1.0 |
| Coumarin | 2.5 |
| Citronellol | 15.0 |
| Phenyl Ethyl Alcohol | 7.5 |
| Musk Xylol | 0.6 |
| Musk Ambrette | 0.4 |
| Peru Balsam | 4.0 |
| Ambre Synthetic | 3.5 |
| Cassia | 1.0 |
| Cinnamic Alcohol | 0.5 |
| Jasmine Synthetic | 1.5 |
| Ionone α | 3.5 |
| Total: | 100.0 |

COMPOSITION B

| Rose de Chine | |
|---|---|
| Geranium Bourbon | 20 |
| Geraniol | 30 |
| Rose Otto Synthetic | 4 |
| cis-3-Normethyl-β-Santalol | 3 |
| Patchouli | 8 |
| Cedarwood | 8 |
| Musk Xylol | 6 |
| Terpineol | 15 |
| Phenyl Ethyl Alcohol | 6 |
| Total: | 100 |

COMPOSITION C

| Chypre | |
| --- | --- |
| Oakmoss | 2.0 |
| Copaiba Balsam | 3.0 |
| trans-3-Normethyl-β-Santalol | 3.0 |
| Coumarin | 3.0 |
| Cedarwood | 6.0 |
| Peru Balsam | 3.0 |
| Terpineol | 55.0 |
| Musk Xylol | 3.0 |
| Patchouli | 1.5 |
| Vetivert | 1.5 |
| Bergamot | 7.0 |
| Musk Ambrette | 6.0 |
| Benzoin Resin | 6.0 |
| Total: | 100.0 |

COMPOSITION D

| Fougere | |
| --- | --- |
| Lavender Oil | 10 |
| Lavandin | 10 |
| Geranium Bourbon | 8 |
| Oakmoss | 4 |
| Coumarin | 6 |
| Patchouli | 3 |
| Cedarwood | 10 |
| cis- and trans-3-Normethyl-β-Santalol* | 12 |
| Methyl Salicylate | 1 |
| Terpinyl Acetate | 12 |
| Amyl Salicylate | 9 |
| Geraniol | 10 |
| Musk Xylol | 5 |
| Total | 100.0 |

*Mixture of cis and trans isomers of 3-normethyl-β-santalol in a ratio of 1:1.1.

The components and proportions in the perfume compositions of this example can be adjusted according to the methods well known in the perfume art to form a wide variety of desirable perfume compositions containing odoriferously effective amounts of these compounds.

EXAMPLE V

SOAP BAR COMPOSITIONS

A conventional household soap bar having the following composition is prepared:

| Component | Percent by Weight |
| --- | --- |
| Sodium Soap | 75.0 |
| Potassium Soap (the total soap comprises a mixture of 80% tallow soap and 20% coconut soap) | |
| Water | 15.0 |
| Perfume Composition A of Example IV | 2.5 |
| Total: | 100.0 |

This soap bar exhibits a desirable sandal fragrance. Composition B, Composition C, or Composition D of Example IV above can be substituted for Composition A in the above soap bar composition to obtain a rose de chine, chypre or fougere fragrance respectively.

EXAMPLE VI

DETERGENT COMPOSITIONS

A conventional, granular, heavy-duty built detergent having the following composition is prepared:

| Component | Percent by Weight |
| --- | --- |
| Sodium dodecyl benzene sulfonate | 20.0 |
| Sodium tripolyphosphate | 50.0 |
| Sodium silicate ($SiO_2$:$Na_2O$ ratio of 2:1) | 6.0 |
| Sodium sulfate | 14.0 |
| Water | 9.8 |
| Perfume Composition A of Example IV | 0.2 |
| Total | 100.0 |

The detergent composition exhibits a desirable sandal fragrance. Composition B, Composition C, Composition D of Example IV can be substituted for Composition A in the above example to obtain a rose de chine, chypre or fougere fragrance respectively.

What is claimed is:

1. 2-Methylene-3-exo(trans-4'-methyl-5'-hydroxypent-3'-enyl)bicyclo[2.2.1]heptane.
2. 2-Methylene-3-exo(cis-4'-methyl-5'-hydroxypent-3'-enyl)bicyclo[2.2.1]heptane.
3. 2-Methylene-3-exo(4'-methyl-5'-hydroxypentyl)bicyclo[2.2.1]heptane.
4. A process for preparing 2-methylene-3-exo(trans-4'-methyl-5'-hydroxypent-3'-enyl)bicyclo[2.2.1]-heptane and 2-methylene-3-exo(cis-4'-methyl-5'-hydroxypent-3'-enyl)bicyclo[2.2.1]heptane comprising the steps of:
   1. admixing 2-methylbicyclo[2.2.1]hept-2-ene with acrolein in a molar ratio of the bicyclic compound to acrolein of from about 1:1 to 10:1 at a temperature of from about 100° to 225° C for a period of from about 1 to 24 hours, to obtain 2-methyl-3-oxatricyclo[$6.2.1.0^{2,7}$]-undec-4-ene and 2-methylene-exo(3'-oxopropyl-bicyclo[2.2.1]-heptane;
   2. admixing in an organic solvent the 2-methyl-3-oxatricyclo[$6.2.1.0^{2,7}$]undec-4-ene obtained in Step (1) with an aqueous mineral acid having a concentration of from 0.001 to 5.0 molar, in a mole ratio of tricyclic compound to acid of from about 1:1 to 1:50 at a temperature of from about 27° to 100° C for from 0.5 to 24 hours;
   3. admixing in an organic solvent the reaction product of Step (2) with (carbethoxyethylidene)triphenyl phosphorane in a molar ratio of said Step (2) reaction product to phosphorane compound of from about 1:1 to 1:5 and a weight ratio of said Step (2) reaction product to solvent of from about 1:2 to 1:50 at a temperature of from about 4° to 100° C for from about 1 to 100 hours;
   4. admixing in an anhydrous organic solvent the reaction product of Step (3) with a dehydrating agent in a molar ratio of said Step (3) reaction product to dehydrating agent of from about 100:1 to 1:20 and a weight ratio of said Step (3) reaction product to anhydrous solvent of from about 1:0.5 to 1:50 under inert atmosphere at a temperature of from about −20° to 50° C for a period of from about 0.5 to 3 hours; and
   5. admixing in an anhydrous organic solvent the reaction product of Step (4) with a reducing agent selected from the group consisting of lithium aluminum hydride, potassium in an alkanol, sodium in an alkanol and lithium in an alkanol in a substantially equivalent molar ratio of said Step (4) reaction product to reducing agent and a weight ratio of said Step (4) reaction product to anhydrous solvent of from about 1:5 to 1:50 under an inert atmosphere at a temperature of from about −50° to 20° C for a period of from about 5 minutes to 2 hours.

5. A process for preparing 2-methylene-3-exo (trans-4'-methyl-5'-hydroxypent-3'-enyl)bicyclo[2.2.1]heptane and 2-methylene-3-exo(cis-4'-methyl-5'-hydroxypent-3'-enyl)-bicyclo[2.2.1]heptane comprising the steps of:
   1. admixing 2-methylbicyclo[2.2.1]hept-2-ene with acrolein in a molar ratio of the bicyclic compound to acrolein of from about 1:1 to 10:1 at a temperature of from about 100° to 225° C for a period of from about 1 to 24 hours, to obtain 2-methyl-3-oxatricyclo[$6.2.1.0^{2,7}$]- undec-4-ene and 2-methylene-3-exo(3'-oxopropyl)bicyclo[2.2.1]heptane;

2. admixing in an organic solvent the 2-methylene-3-exo(3'-oxopropyl)bicyclo[2.2.1]heptane obtained from Step (1) with (carbethoxyethylidene)triphenyl phosphorane in a molar ratio of bicyclic compound to phosphorane compound of from about 1:1 to 1:5 and a weight ratio of bicyclic compound to solvent of from about 1:2 to 1:50 at a temperature of from about 0° to 50° C for a period of from about 1 to 36 hours; and 3. admixing in an anhydrous organic solvent the reaction product of Step (2) with a reducing agent selected from the group consisting of lithium aluminum hydride, potassium in an alkanol, sodium in an alkanol and lithium in an alkanol in a substantially equivalent molar ratio of said Step (2) reaction product to reducing agent and a weight ratio of said Step (2) reaction product to anhydrous solvent of from about 1:5 to 1:50 under an inert atmosphere at a temperature of from about −50° to 20° C for a period of from about 5 minutes to 2 hours.

6. A Process for preparing 2-methylene-3-exo(4'-methyl-5'-hydroxypentyl)bicyclo[2.2.1]heptane comprising the steps of:

1. admixing 2-methylbicyclo[2.2.1]hept-2-ene with acrolein in a molar ratio of the bicyclic compound to acrolein of from about 1:1 to 10:1 at a temperature of from about 100° to 225° C for a period of from about 1 to 24 hours, to obtain 2-methyl-3-oxatricyclo[6.2.1.0$^{2,7}$]-undec-4-ene and 2-methylene-3-exo(3'-oxopropyl)bicyclo[2.2.1]heptane;

2. admixing in an organic solvent the 2-methyl-3-oxatricyclo[6.2.1.0$^{2,7}$]undec-4-ene obtained in Step (1) with an aqueous mineral acid having a concentration of from 0.001 to 5.0 molar, in a mole ratio of tricyclic compound to acid of from about 1:1 to 1:50 at a temperature of from about 27° to 100° C for from 0.5 to 24 hours;

3. admixing in an organic solvent the reaction product of Step (2) with (carbethoxyethylidene)triphenyl phosphorane in a molar ratio of said Step (2) reaction product to phosphorane compound of from about 1:1 to 1:5 and a weight ratio of said Step (2) reaction product to solvent of from about 1:2 to 1:50 at a temperature of from about 4° to 100° C for from about 1 to 100 hours.

4. admixing in an organic solvent the reaction product obtained in Step (3) with a hydrogenation catalyst under a hydrogen atmosphere at a pressure of from 1 to 10 atmospheres at a temperature of from 27° to 100° C for a period of from about 0.5 to 24 hours;

5. admixing in an anhydrous organic solvent the reaction product obtained in Step (4) with a dehydrating agent in a molar ratio of said Step (4) reaction product to dehydrating agent of from about 100:1 to 1:20 and a weight ratio of said Step (4) reaction product to anhydrous solvent of from about 1:0.5 to 1:50 under an inert atmosphere at a temperature of from about −20° to 50° C for a period of from about 0.5 to 3 hours; and 6. admixing in an anhydrous organic solvent the reaction product obtained in Step (5) with a reducing agent selected from the group consisting of lithium aluminum hydride, potassium in an alkanol, sodium in an alkanol and lithium in an alkanol in a substantially equivalent molar ratio of said Step (5) reaction product to reducing agent and in a weight ratio of said Step (5) reaction product to anhydrous organic solvent of from about 1:5 to 1:50 under an inert atmosphere at a temperature of from about −50° to 20° C for a period of from about 5 minutes to 2 hours.

* * * * *

PO-1050
(5/69)

UNITED STATES PATENT OFFICE
CERTIFICATE OF CORRECTION

Patent No. 3,673,261.      Dated       June 27, 1972

Inventor(s)    Herbert C. Kretschmar & William F. Erman

It is certified that error appears in the above-identified patent and that said Letters Patent are hereby corrected as shown below:

Column 3, Line 63, "methylene-3-exo-(4'-carbethoxypentyl)bicyclo [] heptane" should be -- methylene-3-exo-(4'-carbethoxypentyl)bicyclo [2.2.1] heptane --.

Column 4, Line 11, "2-methylbicyclo[d82.2.1]hept-2-ene" should be -- 2-methylbicyclo[2.2.1]hept-2-ene --.

Column 8, Line 24, after "lithium" insert -- aluminum --.

Column 10, Line 8, "2-methylene-3-ero(cis-4'-" should read -- 2-methylene-3-exo(cis-4'- --.

Column 15, Line 66 "-A/;" should be --A/W; --.

Column 16, Line 21, "was undec in" should be -- was placed in --.

Column 16, Line 27, "undex" should be -- undec --.

Column 16, Line 51, "$[6.2.1.0^{2,7}b]$" should be $[6.2.1.0^{2,7}]$ --.

Column 16, Line 53, "(0.116 mole)" should be -- (0.166 mole) --.

Column 17, Line 54, "(m, 4H, C-1, C- " should be -- (m, 4H, C-1, C-4 --.

Column 18, Line 64, after "3'" insert -- -enyl)bicyclo --.

Column 22, Line 6, "$10^{-}{}_{3}$" should be -- $10^{-3}$ --.

Column 24, Line 69, after "heptane" delete the following: -- and 2-methylene-3-exo(cis-4'-methyl-5'-hydroxypent-3'-enyl)-bicyclo [2.2.1]heptane --.

Signed and sealed this 19th day of December 1972.

(SEAL)
Attest:

EDWARD M.FLETCHER,JR.
Attesting Officer

ROBERT GOTTSCHALK
Commissioner of Patents